United States Patent [19]

Allsop et al.

[11] Patent Number: 5,527,146
[45] Date of Patent: *Jun. 18, 1996

[54] VEHICLE-MOUNTED ARTICULATED SUPPORT RACK

[75] Inventors: Ivor J. Allsop; Eivind Clausen, both of Bellingham, Wash.

[73] Assignee: Softride, Inc., Bellingham, Wash.

[*] Notice: The term of this patent shall not extend beyond the expiration date of Pat. No. 5,181,822.

[21] Appl. No.: 277,678

[22] Filed: Jul. 18, 1994

Related U.S. Application Data

[60] Continuation-in-part of Ser. No. 979,800, Nov. 20, 1992, Pat. No. 5,330,312, which is a division of Ser. No. 587,061, Sep. 26, 1990, Pat. No. 5,181,822, which is a continuation-in-part of Ser. No. 397,693, Aug. 23, 1989, abandoned.

[51] Int. Cl.⁶ ..................................................... B60R 9/08
[52] U.S. Cl. .................. 414/462; 224/319; 224/321; 224/324; 224/924; 224/917
[58] Field of Search .............. 224/42.03 B, 42.03 R, 224/42.08, 42.44, 315, 319, 321, 324, 325, 917, 924; 280/513; 414/462, 465, 466, 482, 483, 546, 743, 917

[56] References Cited

U.S. PATENT DOCUMENTS

| | | | |
|---|---|---|---|
| 2,431,400 | 11/1947 | Iverson | 224/42.03 B |
| 3,606,111 | 9/1971 | Gjesdahl . | |
| 3,656,670 | 4/1972 | Hill . | |
| 3,712,522 | 1/1973 | Penniman . | |
| 3,757,975 | 9/1973 | Sneider . | |
| 3,854,641 | 12/1974 | Kohls . | |
| 4,050,616 | 9/1977 | Mosow . | |
| 4,078,708 | 3/1978 | Mayer . | |
| 4,089,448 | 5/1978 | Traeger . | |
| 4,189,274 | 2/1980 | Shaffer | 224/42.03 B X |
| 4,297,069 | 10/1981 | Worthington | 414/462 |
| 4,336,897 | 6/1982 | Luck . | |
| 4,400,129 | 8/1983 | Eisenberg et al. | 414/462 |
| 4,403,716 | 9/1983 | Carlson et al. . | |
| 4,411,580 | 10/1983 | Kelly | 414/462 |
| 4,456,421 | 6/1984 | Robson | 414/546 |
| 4,461,410 | 7/1984 | Tartaglia . | |
| 4,461,413 | 7/1984 | Hoerner | 224/311 |
| 4,573,855 | 3/1986 | Braswell | 414/463 |
| 4,635,835 | 1/1987 | Cole . | |
| 4,640,658 | 2/1987 | Webb, Jr. | 414/462 |
| 4,673,328 | 6/1987 | Shiels | 414/471 |
| 4,676,414 | 6/1987 | Deguevara . | |
| 4,813,584 | 3/1989 | Wiley | 224/42.44 |
| 4,826,387 | 5/1989 | Audet . | |
| 5,025,932 | 6/1991 | Jay | 224/42.03 B X |

Primary Examiner—Karen B. Merritt
Assistant Examiner—Janice L. Krizek
Attorney, Agent, or Firm—Christensen O'Connor Johnson & Kindness

[57] ABSTRACT

A support rack for carrying articles behind a vehicle is disclosed. The rack includes a base member, a forward beam, a rearward beam, a top member, and lock arms. The base member is securable to the rearward end of the vehicle. The forward and rearward beams are pivotally connected to the base member and project upwardly therefrom. The beams are parallel to each other and together form a parallelogram with the base member and the top member. The top member is pivotally connected to the forward and rearward beams. The lock arms are for releasably locking the forward beam and the rearward beam in upright positions above the base member. Support arms are also slidably coupled to the top member for securing bicycles thereon. A crank clamp attachment structure is also provided, which fits on top of the top member to hold extra bicycles. The crank clamp attachment structure includes crank clamps and wheel rails. A ski rack is also disclosed that may be pivotally coupled to the support rack.

25 Claims, 17 Drawing Sheets

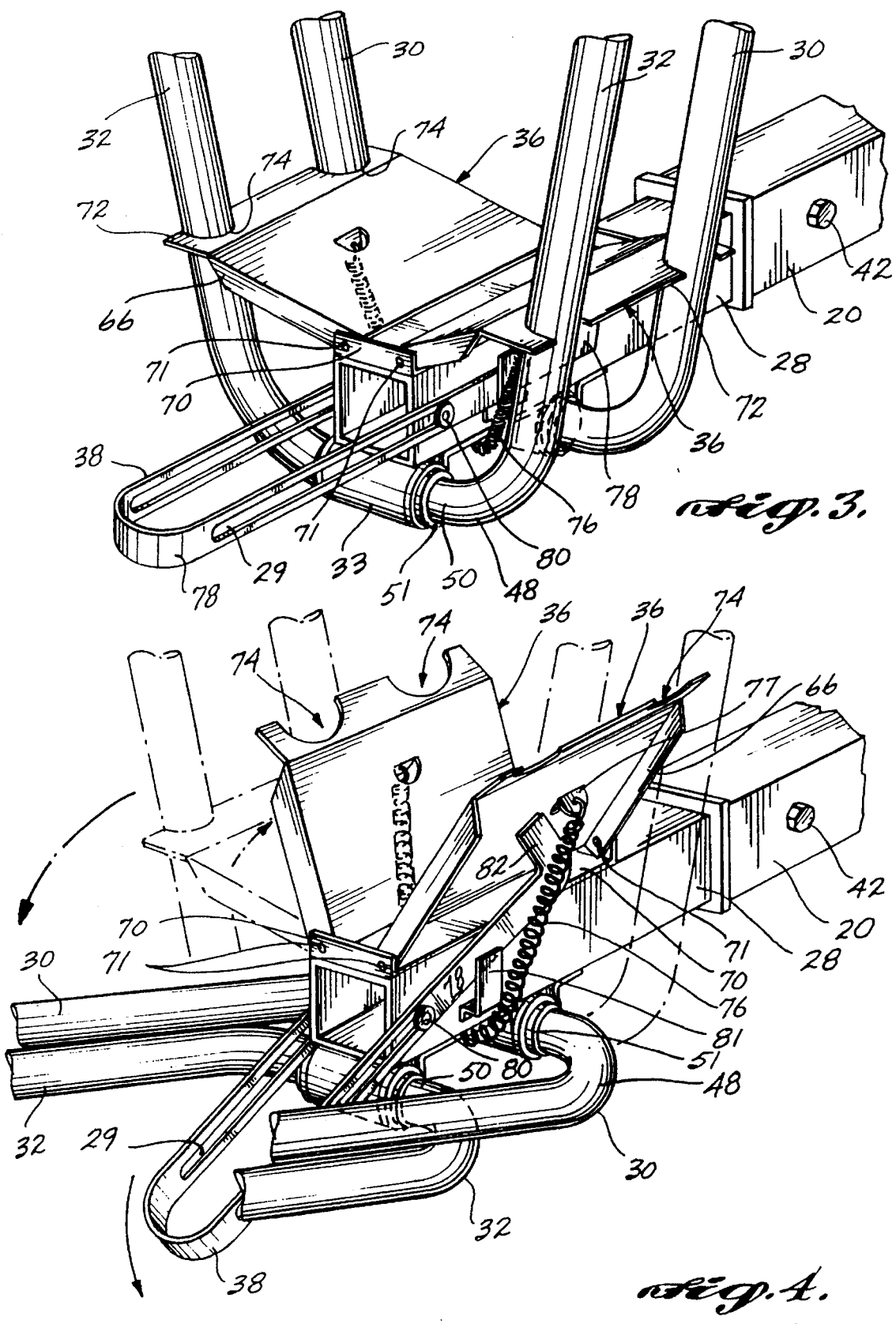

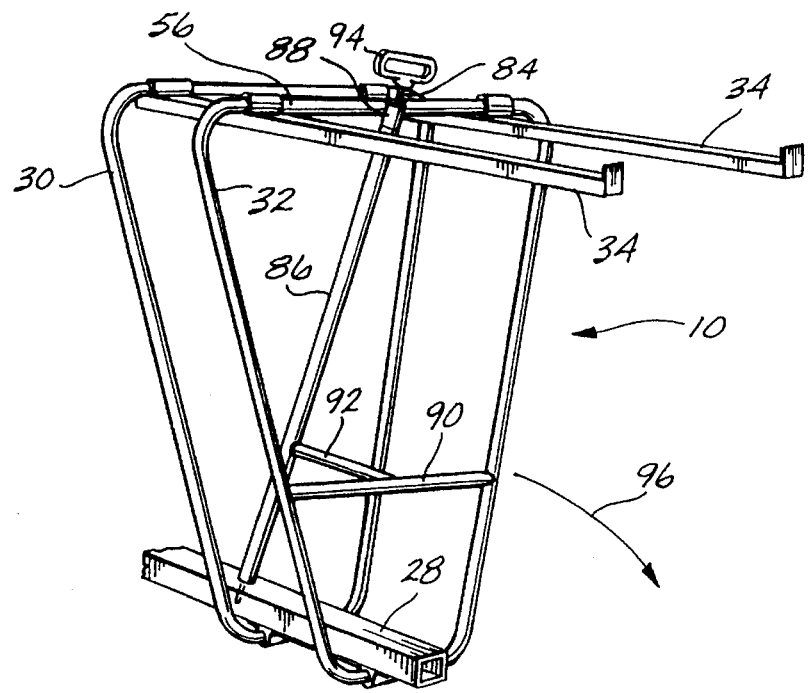
Fig. 5.
Fig. 6.
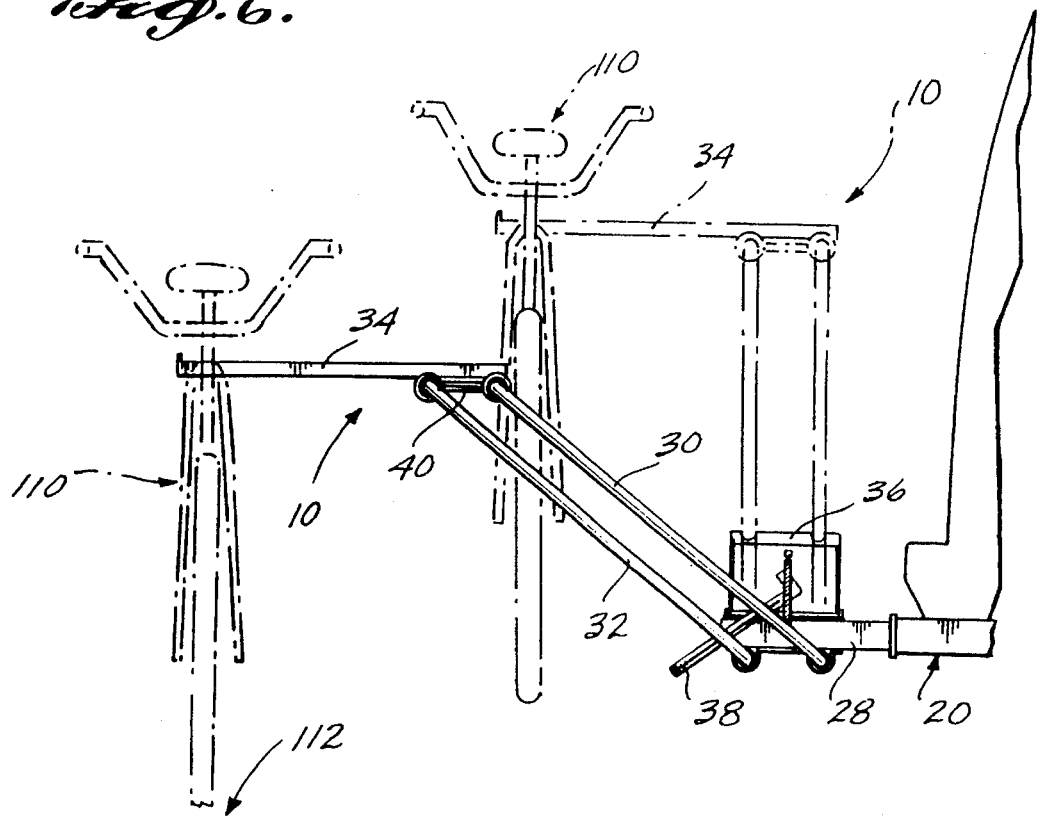

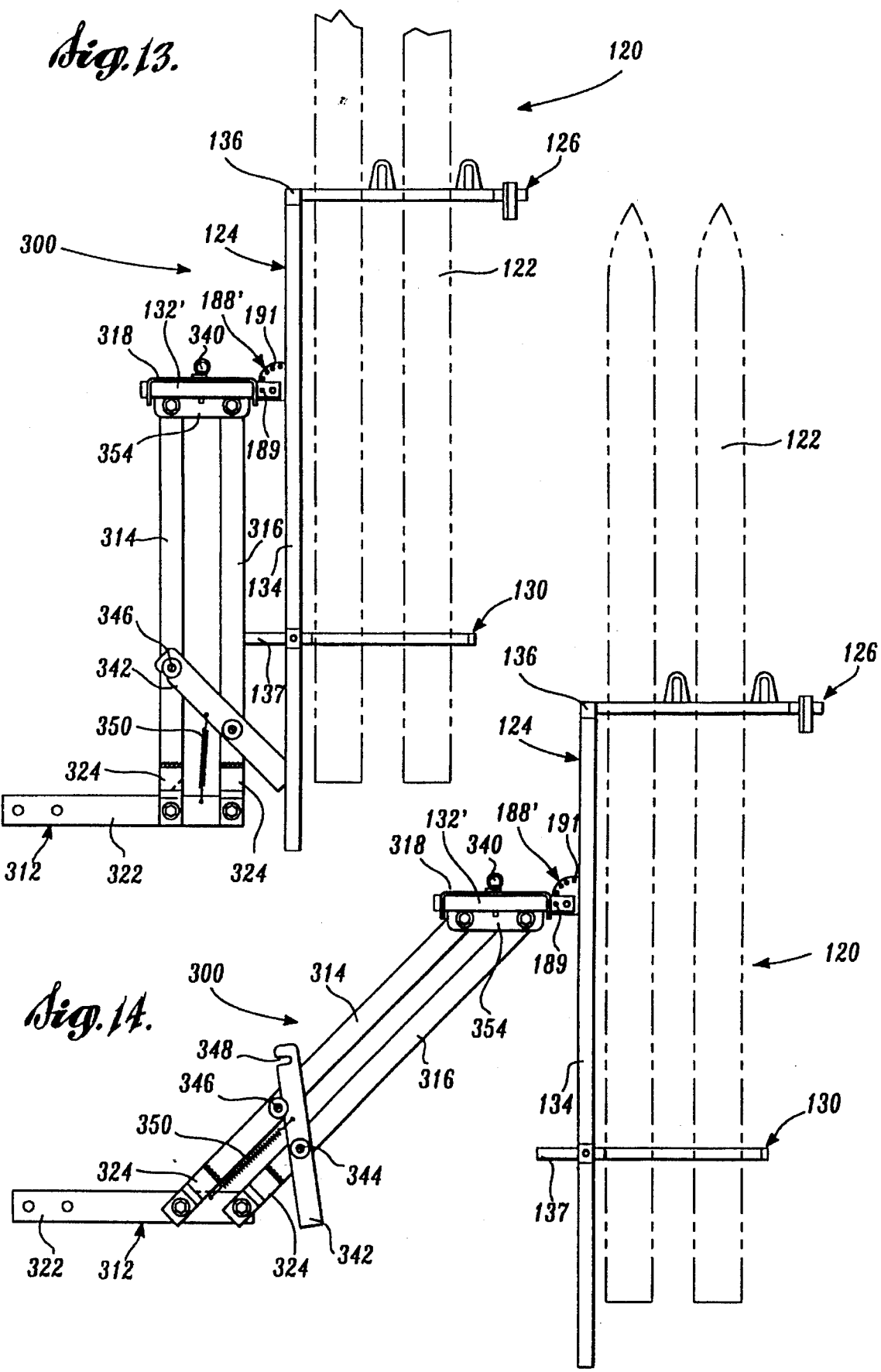

VEHICLE-MOUNTED ARTICULATED SUPPORT RACK

This application is a continuation-in-part of application Ser. No. 07/979,800 filed Nov. 20, 1992, now U.S. Pat. No. 5,330,312; which was a divisional of application Ser. No. 07/587,061 filed Sep. 26, 1990, now U.S. Pat. No. 5,181,822; which was a continuation-in-part of application Ser. No. 07/397,693 filed Aug. 23, 1989, now abandoned.

TECHNICAL FIELD

The present invention pertains to support frames for supporting objects on the exterior of motor vehicles, and, more particularly, to an articulated support rack that is attachable to vehicle trailer hitches.

BACKGROUND OF THE INVENTION

Support racks are typically mounted on the exterior of a motor vehicle to support bicycles, minibikes, skis, surfboards, and the like, above the ground. Rear-mounted racks are constructed of rigid frame members, having arms extending horizontally therefrom for supporting objects, and they are usually mounted on the rear bumper of the vehicle, or on the trunk lid, or a combination of both. Several racks have also been developed for use on the top of a vehicle. These racks are usually held by straps extending to the rain gutters or door recesses of a vehicle.

While these support racks have been adequate for their purposes, they have several drawbacks. Because the rear-mounted racks are fixedly mounted on the rear of the vehicle, they restrict access to vehicles having rearward-opening doors, tailgates, or lift gates, such as sport/utility vehicles, vans, pickup trucks, campers, and the like. When mounted on the rear of cars, these racks may also interfere with the opening of or access to the trunk. In addition, difficult lifting is frequently required to place heavy objects on and remove them from the support arms.

The cartop racks have the drawback of requiring that the article to be transported be lifted on top of the vehicle. This can be quite difficult on a tall vehicle, such as a sport/utility vehicle or van, especially when a heavy or awkward object is to be carried, such as a bicycle. Other drawbacks include extra drag on the vehicle, especially at high speeds; increased effective vehicle height resulting in decreased overhead clearance, a serious problem when entering a parking garage; and marring of the vehicle surface due to contact of the rack and straps.

Several devices have been proposed for overcoming these disadvantages. For instance, U.S. Pat. No. 4,400,129, issued to Eisenberg et al. on Aug. 23, 1983, discloses a pair of horizontally projecting arms mounted to the crossmember of a T-shaped support member that in turn is pivotally mounted to a vehicle. A substantial drawback to this device is that, as the T-shaped support member is pivoted downward, the pair of arms angle downward, allowing an object supported thereon to slide off. Even if the object were firmly fastened to the support member, it would not be held in an upright position as the support arm is pivoted downward. In U.S. Pat. No. 4,635,835, issued to Cole on Jan. 13, 1987, a carrier apparatus for carrying an all-terrain vehicle is disclosed having a frame pivotally mounted to a horizontal beam that is attached to a trailer hitch. An all-terrain vehicle is mounted to the frame and supported in a vertical position for transportation and then lowered to a horizontal position for loading and unloading. An obvious drawback to this device is that vertically positioning the all-terrain vehicle, or any motorized vehicle, for that matter, can easily cause fuel, oil, and cooling liquids to drain from the engine, creating a fire hazard and the potential for damage and injury. In addition, the rigidly mounted support arms will not hold a bicycle or motorcycle in an upright orientation as the carrier apparatus is pivoted between the vertical and horizontal orientations.

Consequently, there is a need for a support rack that can be mounted to the rear of a vehicle and that not only allows access to the rear doors of the vehicle without requiring removal of the supported objects and the support frame, but also maintains the objects in an upright position as the frame pivots between a horizontal or lowered position, with the object on or close to the ground, and a vertical or raised position, with the object supported above the ground.

SUMMARY OF THE INVENTION

A support rack for carrying articles, such as bicycles, behind a vehicle is provided. The rack includes a base member, a forward beam, a rearward beam, a top member, and a lock means. The base member is securable to the rear end of the vehicle to project rearwardly from the vehicle. The forward beam is pivotally connected to the base member and projects upwardly therefrom. The rearward beam pivotally connects to the base member and also projects upwardly therefrom. The rearward beam is disposed rearwardly of the forward beam. The top member is pivotally connected to the forward beam and pivotally connected to the rearward beam. The distance between the pivotal connections of the forward beam being substantially equal to the distance between the pivotal connections of the rearward beam. Also, the distance between the pivotal connections of the top member is substantially equal to the distance between the pivotal connections of the base member. The lock means is for releasably locking the forward and rearward beams in upright positions above the base member.

In the preferred embodiment of the invention, the rack also includes rearwardly extending support arms coupled to the top member. The support arms are slidably coupled to the top member for removable engagement therewith.

As a further aspect of the invention, the forward beam is parallel to the rearward beam. The beams extend generally vertically when locked in upright positions. Also, in the preferred embodiment, the base member is generally horizontal. The connections of the forward and rearward beams also both lie substantially within a horizontal plane.

The lock means preferably comprise a first lock arm pivotally attached to the rearward beam. This first lock arm has a forward end releasably secured to the forward beam when the beams are in upright positions. Preferably, the first lock arm is angled relative to the beams. The first lock arm further includes a rearwardly extending end that projects rearward of the rearward beam. This allows the first lock arm to be pivotally moved by applying a downward force to its rearwardly extending end. Another aspect of the lock means includes a second lock arm pivotally attached to the rearward beam. The second lock arm has a forward end releasably secured to the forward beam when the beams are in upright positions. The second lock arm also has the same angle relative to the beams as the first lock arm. The second lock arm also includes a rearwardly extending end that projects behind the rearward beam such that the second lock arm can be pivotally moved by applying a downward force to the rearwardly extending end. The release of both of the lock arms thus allows the beams to pivot relative to the base member. The lock means further include biasing means for biasing the forward ends of the lock arms in a downward direction. The lock means also includes a lock fastener secured to the forward beam. The first lock arm is L shaped and includes a notch at its forward end for releasable attachment to the lock fastener.

A further aspect of the invention includes a ski rack attachment coupled to the top member. The ski rack attachment preferably includes a main frame and mounting arms attached to the main frame. The mounting arms are removably coupled to the top member. A hinge assembly is provided on the ski rack attachment between the mounting arms and the main frame. The hinge assembly allows the main frame to be pivoted relative to the top member. The hinge assembly includes a detent pin and an aperture plate affixed to the main frame. The aperture plate has pin apertures to receive the detent pin, each pin aperture corresponding to a discrete pivot position of the main frame.

Another aspect of the support rack of the present invention includes a crank clamp attachment that is coupled to the top of the top member. The crank clamp attachment includes a support member and a first crank clamp. The support member is coupled to the top member. The first crank clamp is arranged and configured to secure a crank arm of a bicycle. The crank clamp is affixed to the support member.

In the preferred embodiment, the crank clamp attachment further comprises a first wheel rail for securing a wheel of the bicycle held by the crank clamp. The wheel rail is affixed to the top of the support member. The first crank clamp includes an upwardly projecting C-shaped housing to receive the crank arm. The first crank clamp also includes a screw engaged within the back of the housing to clamp the end of the crank arm against the housing.

In the preferred embodiment, the crank clamp attachment also includes a second crank clamp arranged and configured to secure a crank arm of a bicycle. The second crank clamp is affixed to the support member and spaced from the first crank clamp. The crank clamp attachment also includes a second wheel rail for securing a wheel of the bicycle held by the second crank clamp. The second wheel rail is affixed to the support member and is spaced from the first wheel rail.

In an alternate embodiment of the invention, the crank clamp attachment also includes a third crank clamp arranged and configured to secure a crank arm of a bicycle. The third crank clamp is affixed to the support member and spaced from the first and the second crank clamps. The crank clamp attachment further comprises a third wheel rail for securing a wheel of the bicycle held by the third crank clamp. The third wheel rail is affixed to the support member and spaced from the first and second wheel rails.

In the preferred embodiment, the crank clamp attachment support member is constructed of a plate secured to the top member. The plate has forward, rearward, left, and right edges. The intersections of the edges form corners. The wheel rails are attached at opposite corners of the plate.

A ski rack for attachment to the rear of the vehicle is also provided. The ski rack includes a main frame, a support frame, mounting arms, and a hinge assembly. The support frame is attached to the main frame and includes support means for holding objects. The mounting arms are coupled to the main frame for securing the main frame to the vehicle. The hinge assembly is attached between the mounting arms and the main frame. The hinge assembly allows the main frame to be pivoted relative to the top member. The hinge assembly includes a detent pin and an aperture plate affixed to the main frame. The aperture plate has pin apertures to receive the detent pin. Each pin aperture corresponds to a discrete pivot position of the main frame.

A crank clamp assembly for holding bicycles behind a vehicle is also provided. The crank clamp assembly includes an attachment structure, a support member, and a first crank clamp. The attachment structure is coupleable to the vehicle. The support member is attached to the attachment structure. The first crank clamp is arranged and configured to secure a crank arm of a bicycle. The crank clamp is affixed to the support member.

In the preferred embodiment of the crank clamp assembly, a first wheel holddown is provided for securing a wheel of the bicycle held by the crank clamp. The first wheel holddown is affixed to the support member. A second wheel holddown may also be provided on the preferred embodiment of the crank clamp assembly, which includes a second crank clamp. A third crank clamp and a third wheel holddown may also be provided, as discussed above.

In one embodiment of the crank clamp assembly, the attachment structure comprises a base member for engagement with a vehicle hitch and a beam attached to the base member. The beam extends upwardly from the base member, and the support member is attached to the beam. In one embodiment, the beam is fixedly attached to the base member.

As will be readily appreciated from the foregoing description, the present invention provides a unique support rack that easily mounts to existing trailer hitch sleeves, thus eliminating the need for attachment to a vehicle bumper. The rack not only pivots away from the vehicle to allow unrestricted access to the vehicle interior through the doors at the rear of the vehicle, but also maintains the bicycles, skis, et cetera in an upright position as the rack pivots. This provides for easy loading and unloading of the objects to and from the rack and maintains a substantially clear space around the rear of the vehicle when the rack is pivoted away from the vehicle. In addition, spillage of fuel and other liquids from motorcycles is avoided. The need to lift objects onto the roof of the vehicle is also avoided. The simplified construction of the frame members, as well as the improved latch mechanism, provide a sturdy and safe articulated rack that is less costly to manufacture. The rack also provides an attachment point for securing a bicycle to the rack to hold it steady for maintenance and repairs. The unique release levers permit a user to use a simple downward pushing motion with the foot to release the upright beams and allow them to pivot away from the rear of the vehicle.

The crank-arm clamp aspect of the invention provides a means to transport extra bicycles with the same rack. It also holds the bicycles in close to the rear of the vehicle so that bending torque on the mount beam and receiver hitch is not excessive. The alternate embodiment of the crank-arm clamp that is not articulated provides an inexpensive rack that safely and effectively carries bicycles without marring any painted surfaces.

BRIEF DESCRIPTION OF THE DRAWINGS

The foregoing and other features and advantages of the present invention will be more readily appreciated as the same becomes better understood from the detailed description, when considered in conjunction with the following drawings, wherein:

FIG. 3 is an enlarged isometric view of the locking plates and the release lever in the locked position;

FIG. 4 is an enlarged isometric view showing the release lever depressed and the locking plates disengaged from the frame;

FIG. 5 is a perspective view of an alternative embodiment of a releasable lock in the form of a slidable locking rod;

FIG. 6 is a side view of the articulated support rack in the upright and horizontal positions;

FIG. 13 is a side elevational view of the rack of FIG. 10 having a ski rack attachment similar to that of FIG. 8 attached thereto;

FIG. 14 is a side elevational view of the rack illustrated in FIG. 13 in a lowered position;

DETAILED DESCRIPTION OF THE PREFERRED EMBODIMENTS

The following description will first address aspects of the invention described in some detail in the parent U.S. application Ser. No. 07/979,800, now U.S. Pat. No. 5,330,312 with reference to FIGS. 1 through 9. A discussion of the embodiments of the present invention will then continue with reference to FIGS. 10 through 20.

Figure 1:
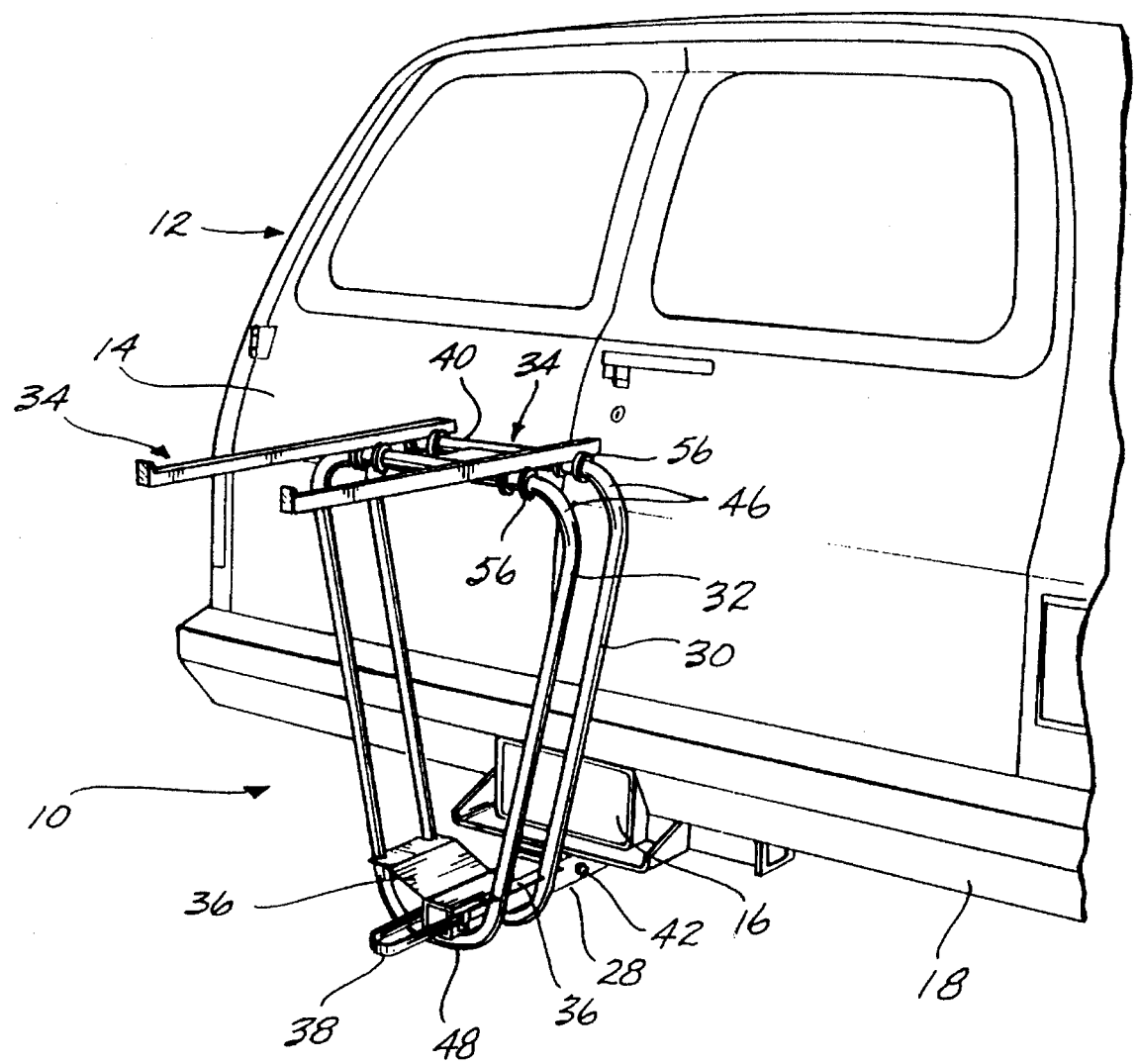
FIG. 1 is a perspective view of the articulated support rack mounted on the rear of a van.
Figure 2:
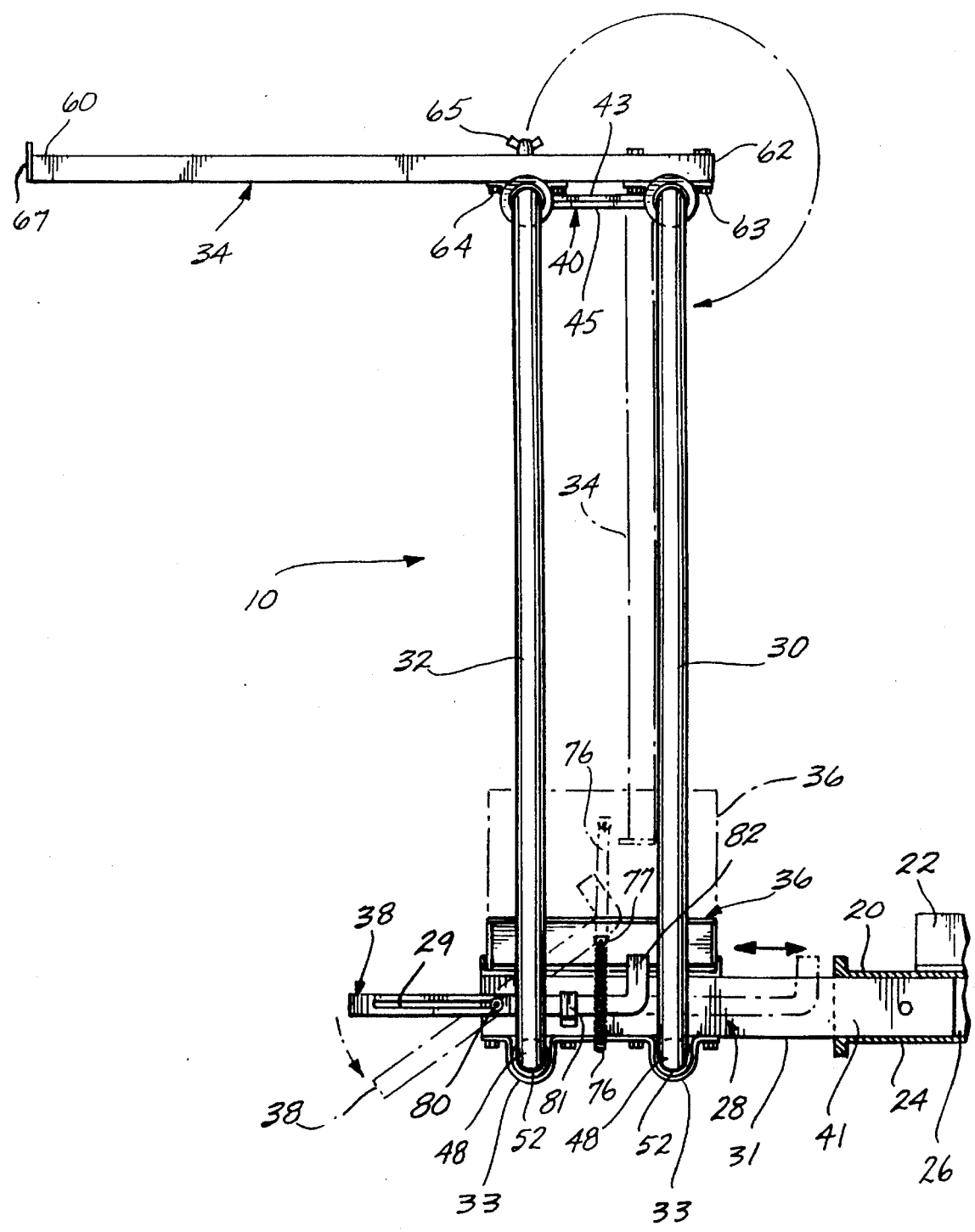
FIG. 2 is a side view of the articulated support rack of FIG. 1, showing in partial cross section the engagement of the rack with a trailer hitch sleeve.

Referring initially to FIGS. 1 and 2, a representative embodiment of the support rack 10 formed in accordance with the present invention is shown attached to a vehicle 12, and, more particularly, to a van-type vehicle having rearward-opening doors 14. A license plate 16 is mounted on a bumper 18 at the rear of the vehicle 12. A trailer hitch sleeve 20 is attached to a frame rail 22 underneath the back of the vehicle 12. The trailer hitch sleeve 20, as well known in the art, is formed from planar walls 24 that define a longitudinal axial cavity 26 of square or rectangular cross section.

The support rack 10 is comprised generally of a base member 28 extending longitudinally relative to the vehicle 12, a first arcuate support frame member 30 mounted on the base member 28 and positioned nearest to the vehicle 12, a second arcuate support frame member 32 pivotally mounted on the base member 28 and positioned in spaced parallel relationship to the first frame member 30 to be farthest from the vehicle 12, a pair of rearwardly extending arms 34 mounted to the tops of the support frame members 30 and 32, a pair of releasable lock plates 36 mounted on the top of and extending along the base member 28, and a release lever 38 mounted on the base member 28 beneath the lock plates 36. A crossmember 40 extends horizontally between the arms 34 to connect the upper ends of the first frame member 30 and the second frame member 32.

Figure 2A:
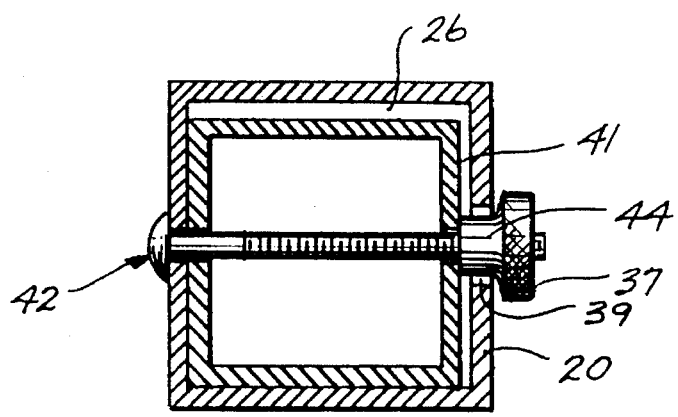
FIG. 2A is a cross-sectional view of the trailer hitch sleeve/frame base member interface as viewed along line 2A—2A in FIG. 2.

As shown more clearly in FIGS. 2 and 2A, the base member 28 is formed of a hollow pipe or tube having a generally square or rectangular cross-sectional shape. The base member 28 has a forward tongue portion 41 that is sized and shaped to be slidably received within the cavity 26 of the trailer hitch sleeve 20. The base member tongue portion 41 has an outer cross-sectional profile that is smaller than the profile of the trailer hitch cavity to facilitate the rapid installation and removal of the support rack 10. A threaded crossbolt 42 projects transversely through the trailer hitch sleeve 20 and the tongue portion 41 to lock the base member 28 in engagement with the sleeve 20. The crossbolt 42 is held in place by a nut 37 with an inner shoulder 44 that passes through a bore 39 formed in the trailer hitch sleeve 20. The nut inner shoulder 44 abuts the base member tongue portion 41 to urge the tongue portion against the inner wall of the hitch sleeve 20. This reduces the vibrations of the support rack 10 and helps prevent the crossbolt from loosening when the vehicle is in motion.

The first and second frame members 30 and 32 are preferably composed of tubular metal and formed to assume a triangular shape with rounded corners 46 at the top. The bottom corner or apex 48 of the frame member has a straight portion 50 that is pivotally mounted within a tubular sleeve 51 affixed transversely to the bottom face 31 of the base member 28 by a sleeve bracket 33. The first and second frame members 30 and 32, respectively, are further each formed with a top rail 54 that is separated into two spaced-apart sections, one integral with each rounded corner 46.

Figure 2B:
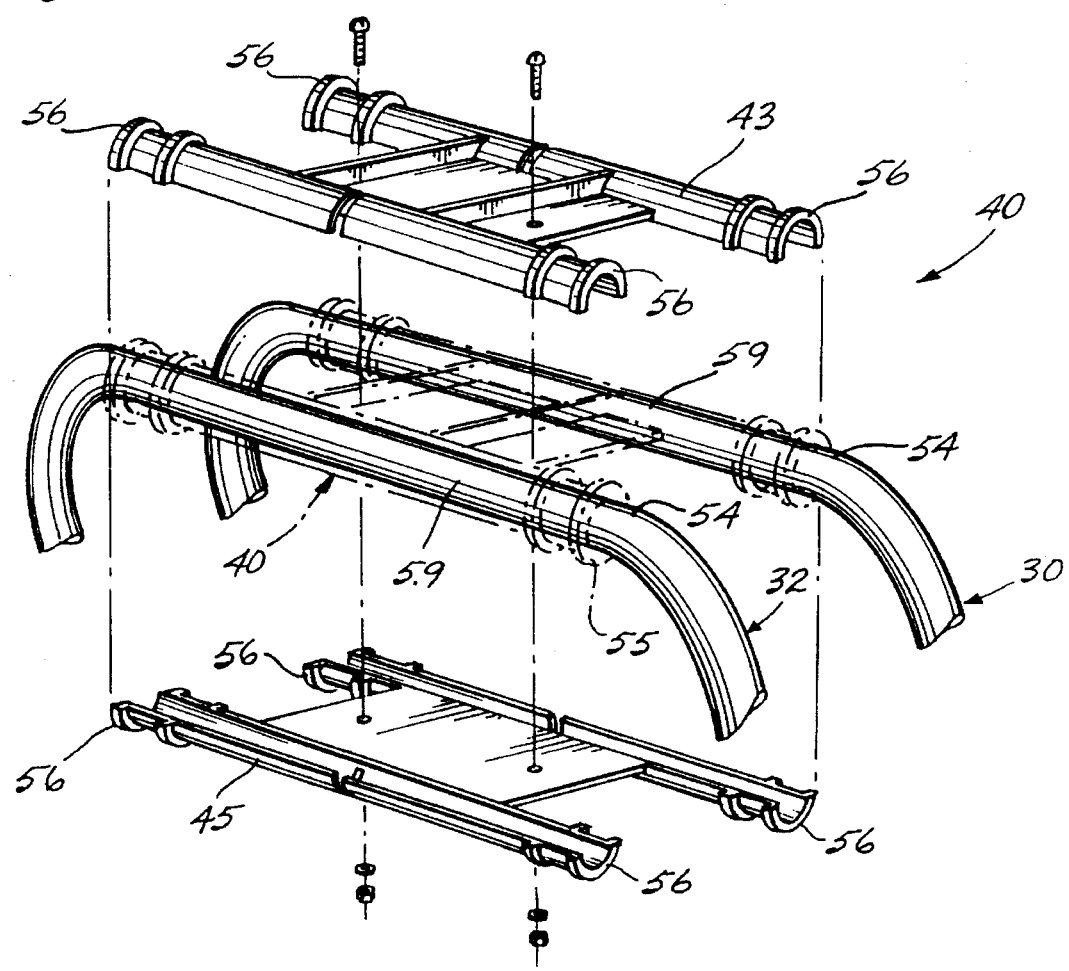
FIG. 2B is an exploded view of the crossmember used to secure the support frame members of FIG. 2 together.

The crossmember 40, shown more clearly in FIG. 2B, is formed from two identical pieces of molded plastic, a top half 43 and a bottom half 45, that are held together with suitable fasteners 49. The crossmember 40 is pivotally secured to the frame members 30 and 32 by bushings 55 that are formed of semicircular sections 56 that are integrally molded as part of the crossmember pieces 43 and 45. The bushings 55 are each formed with a pair of spaced-apart lips 57 that define a saddle space 58. Pipes 59 of smaller diameter than the frame members 30 and 32 connect the top rails 54 of each frame member together. The crossmember 40 rigidly holds the first and second frame members 30 and 32 in spaced parallel relationship, while allowing the frame members 30 and 32 to pivot as they move between a raised position and a lowered position, as will be described in more detail below.

The pair of arms 34 have distal, rearward ends 60 that project away from the vehicle 12 and proximal, forward ends 62 that are pivotally mounted to the first frame member 30 by a clamp 63. Releasable threaded fasteners 61 secure the arms 34 and clamps 63 together. Each arm 34 is constructed of tubular metal having a generally square cross-sectional shape. With the forward, proximal end 62 of each arm 34 pivotally mounted to the first frame member 30, each arm 34 can pivot clockwise when the frame members 30 and 32 are in the lowered, horizontal position, as shown in dotted line in FIG. 2, to a stored configuration wherein each arm 34 lies adjacent and parallel to the first frame member 30. When the arm 34 is swung counterclockwise, it will contact the top rail 54 of second frame member 32 when it is in a horizontal position or a deployed configuration. A clamp 64 and releasable fastener 65 positioned around the crossmember 40 on each top rail 54 retain each arm 34 in engagement with the second frame member 32, while permitting limited movement of the second support frame member 32 with respect to each arm 34. A stop plate 67 is attached over the free end of each arm's rearward end 60 in order to block rearward movement of bicycles placed on the arms 34.

Referring next to FIG. 3, the mounting and operation of the releasable lock plates 36 will now be described. Each lock plate 36 has folded-over sides 66 pivotally mounted at one end to the top surface 68 of the base member 28 by a bracket 70 and hinge pins 71. The outside edge 72 of each lock plate 36 has two notches 74 formed thereon that are sized to fairly closely engage the first and second support frame members 30 and 32 when they are in a substantially raised or vertical position, as shown in FIG. 3. A helical extension spring 76 is attached at one end to the base member 28 and at the other end to a tab 77 on each lock plate 36 to resiliently urge the lock plates 36 into engagement with the first and second frame members 30 and 32. The four notches 74 provide substantially positive locking engagement with the frame members 30 and 32, and appreciable movement of the frame members 30 and 32 can take place only when the lock plates are released.

In order to release the lock plates 36 from engagement with the support frame members 30 and 32, the lock plates 36 must be pivoted upwardly away from the frame members 30 and 32 about bracket 70. One method for doing this is with the use of the release lever 38. As shown in FIGS. 3 and 4, the release lever 38 is generally U-shaped and is slidably mounted to the base member 28 by pins 80 that extend through elongated slots 29 formed in each side of the lever 38 and by brackets 81 on each side thereof to position the free ends 78 of the lever 38 under a corresponding lock plate 36. As shown in FIG. 3, the release lever 38 is slidable along the base member 28 so that only a small portion protrudes rearwardly therefrom. In this stored configuration, the release lever is positioned to avoid interference with bicycles or other objects supported on the rack 10. In a deployed configuration, the release lever 38 is slid rearwardly relative to the base member 28 to provide a greater mechanical advantage, as shown in FIG. 4. A downward force applied to the release lever 38, such as from a foot, causes the release lever 38 to pivot on the pins 80. Fingers 82 projecting upward from the ends 78 of the release lever 38 are moved upwardly into contact against the underside of the lock plates 36 to pivot the lock plates 36 upwardly about their hinges 71 and disengage from the first and second frame members 30 and 32. The first and second frame members 30 and 32 may then be moved from the substantially raised position to a lowered position.

Other methods may be used for locking the first and second support frame members 30 and 32 in the upright position. For instance, in FIG. 5, the first and second support frame members 30 and 32 are locked in the upright position by rod 84 that is slidably engaged within a tube 86. The tube 86 extends diagonally upward and rearward from an elevation slightly above the base member 28 with the upper end 88 of the tube 86 fixedly attached to the top rail 54 of the second frame member 32. A lower crossbar 90 formed on the second frame member 32 has a rearward horizontal leg 92 that is attached to an intermediate portion of the tube 86 to rigidly hold the tube 86 in position. The rod 84 has a handle 94 at its upper end, with the lower end projecting into an opening (not shown) formed in the base member 28. To release the first and second frame members 30 and 32 from the upright positions, the handle 94 is used to pull the rod 84 upward and out of engagement with the base member 28. The support frame members 30 and 32 can then be pivoted outward and downward as represented by arrow 96.

The operation of the support rack 10 will now be described in conjunction with FIG. 6. Initially, the support rack 10 is mounted to the trailer hitch sleeve 20 by inserting the tongue portion 41 of the base member 28 into the cavity 26 of the sleeve 20. The bolt 42 is then engaged through aligned cross-holes formed in the sleeve 20 and the tongue portion 41 to firmly lock the base member 28 in engagement with the hitch sleeve 20.

For purposes of description, a bicycle 110 is illustrated in an upright position on the ground 112. The first and second frame members 30 and 32 are pivoted counterclockwise to move away from the vehicle 12 and lower the pair of arms 34 to a level that allows the bicycle 110 to be slid or leaned onto the pair of arms 34. Because the frame members 30 and 32 are held in parallel relationship as they pivot, the pair of arms 34 will remain in a substantially horizontal position through the full range of motion of the frame members 30 and 32. The frame members 30 and 32, arms 34, and base member 28 cooperatively form a parallelogram, four-bar linkage arrangement.

After the bicycle 110 is placed on the arms 34, the first and second frame members 30 and 32 are pivoted clockwise toward the vehicle 12 to raise the bicycle 110 off the ground 112. The first and second frame members 30 and 32 continue to rotate in a clockwise direction, as shown in FIG. 6, until they engage the notches 74 on the lock plates 36, which prevent further rotation or movement of the first and second frame members 30 and 32 in either direction in the vertical plane. To release the first and second frame members 30 and 32, the release lever 38 is pulled out, and a downward force is applied thereon to urge the fingers 82 to contact and move the lock plates 36 upward and out of engagement with the first and second frame members 30 and 32. The first and second frame members 30 and 32 may then be pivoted downwardly away from the vehicle 12 to load or unload the bicycle 110 and provide access to the interior of the vehicle 12 through the rear doors 14.

Figure 7:
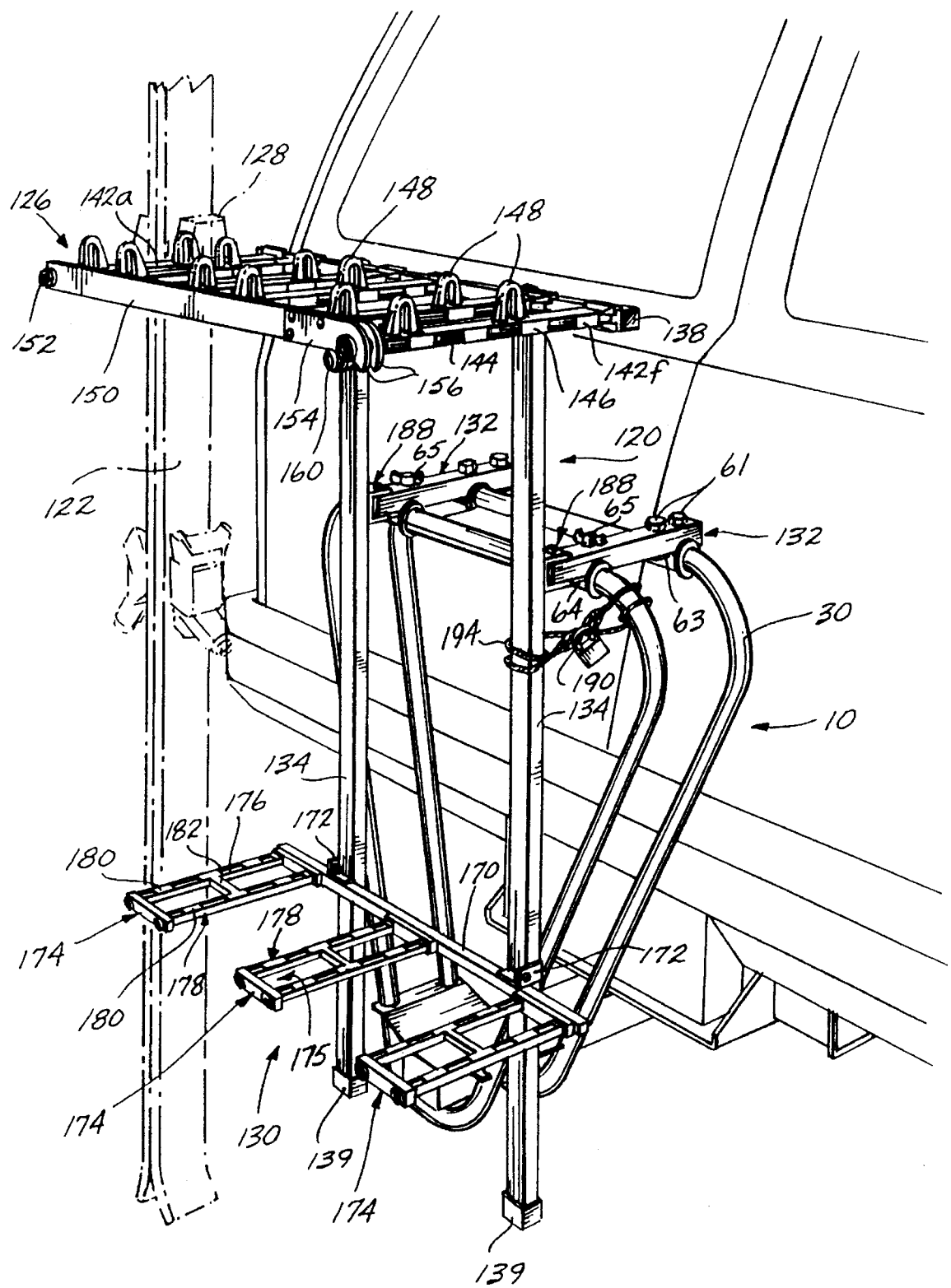
FIG. 7 is an perspective view of a ski rack mounted to the articulated support frame of this invention.

FIG. 7 depicts the support rack 10 with a ski rack 120 for carrying several pairs of skis 122. The ski rack 120 includes a vertically oriented main frame 124 with a horizontally oriented support frame 126 attached thereto from which the skis 122 are suspended by their toe clips 128. A locking frame 130 is attached to the main frame 124 below the support frame 126 to prevent the skis from swaying. The ski rack 120 also includes a pair of mounting arms 132 for attaching the ski rack to the first and second support frame members 30 and 32, respectively, in place of the rearward extending bicycle support arms 34 (FIG. 1).

Figure 8:
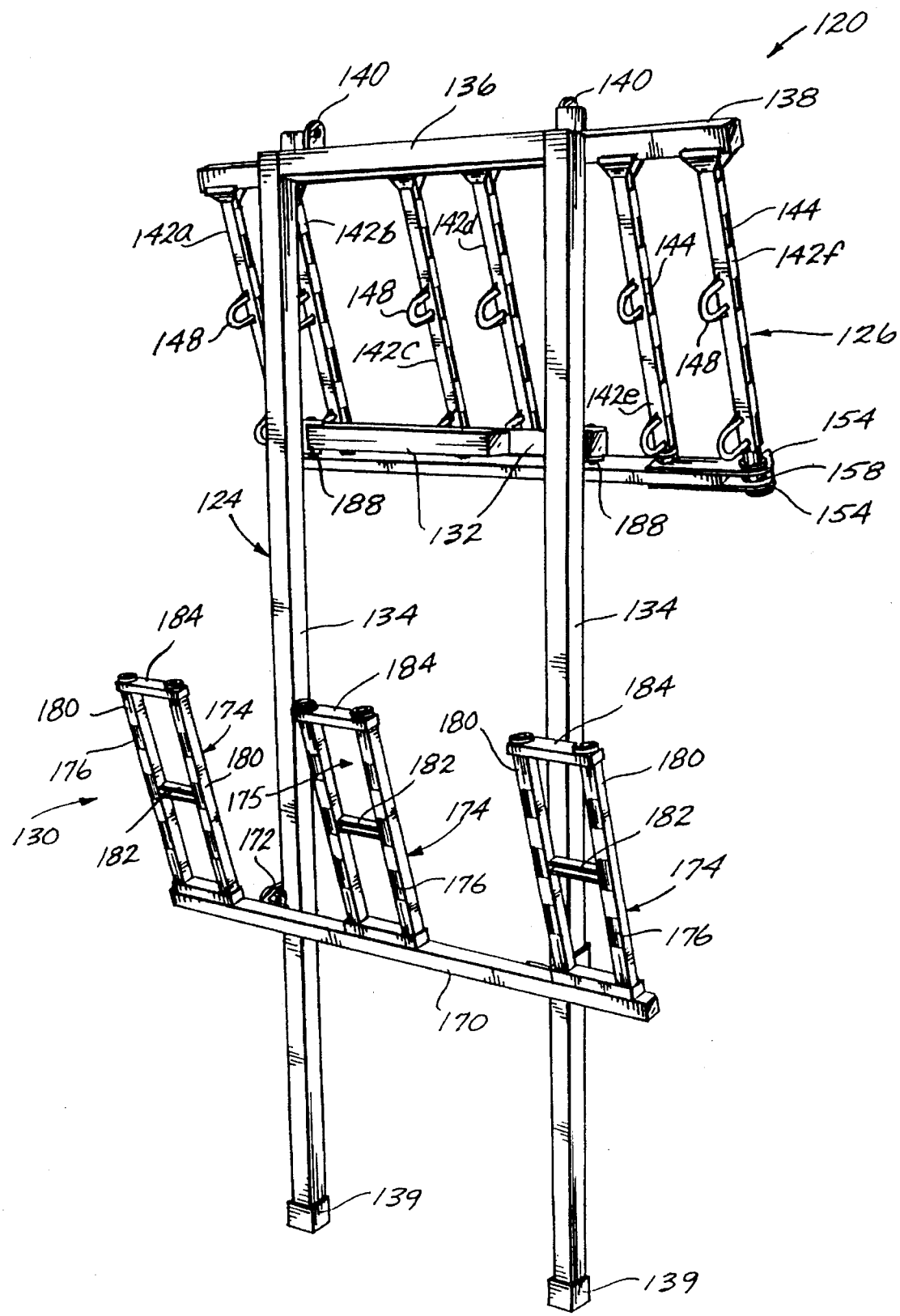
FIG. 8 is a perspective view of the ski rack in its collapsed, or folded up, state.

As illustrated in FIG. 7 and 8, the ski rack main frame 124 comprises a pair of parallel, spaced-apart vertical beams 134 that are connected at their top ends by a horizontally aligned crossbeam 136, as depicted in FIG. 8. The bottom open ends of the vertical beams 134 are covered by protective plastic caps 139. The support frame 126 includes a first crossbeam 138 that is located above and extends on either side of the main frame crossbeam 136. The support frame first crossbeam 138 is attached to the main frame 124 by a pair of hinge assemblies 140 that are also attached to the top ends of the main frame vertical beams 134. The hinge assemblies 140 allow the support frame 126 to be rotated about the top of the main frame 124 so that the support frame can be placed in a collapsed position wherein the free end of the frame is adjacent the point at which the mounting arms are attached to the main frame.

Extending perpendicularly rearward from the support frame first crossbeam 138 are a set of spaced-apart support arms 142*a*, 142*b*, 142*c*, 142*d*, 142*e*, and 142*f*. The support arms are arranged in closely spaced pairs, 142*a* and 142*b*, 142*c* and 142*d*, and 142*e* and 142*f*. This arrangement allows pairs of skis to be placed together, bottom surface to bottom surface between each pair of support arms 142, such that downward movement of the skis will be limited by the skis' toe clips abutting the support arms. Each support arm 142 includes a metal rod 144 that is welded to the support frame first crossbeam 138. Located over each metal rod 144 is a rectangular plastic sheath 146 that protects the skis from being dented or scratched by the metal rods. Integral with each sheath 146 is a pair of inverted-U-shaped hooks 148. The hooks 148 are spaced from the support frame first crossbeam 138 and each other by a distance slightly greater than the width of a ski 122. When the skis 122 are mounted in the support frame 126, a rope can be wound through the hooks 148 to secure the skis to the rack 120.

A support frame second crossbeam 150 extends between the support arms 142*a* and 142*f* located at each end of the support frame 126. The support frame second crossbeam 150 is rotatably attached to a mounting finger 152 that extends from the free end of end-located support arm 142*a*. The intermediately located support arms 142*b*, 142*c*, 142*d*, and 142*e* are dimensioned so that their free ends are spaced a small distance away from the second crossbeam 150. In one embodiment of the invention, support arms 142*b*, 142*c*, 142*d*, and 142*e* are spaced approximately one-quarter inch from the second crossbeam 150.

Attached to opposite sides of the free end of the support frame second crossbeam 150 are a pair of locking plates 154. Each locking plate has a laterally extending, inverted-J-shaped extended section 156. The extended sections 156 are normally positioned around a locking finger 158 that extends rearward from end support arm 142*f*. A lock 160 is mounted to a set of lock flames 162 integral with the locking plates 154 and spaced below the crossbeam 150. The lock 160 has a rotating tongue (not illustrated) that can be set against the locking finger 158 to prevent the rotation of the support frame second crossbeam 150.

The locking frame 130 is located approximately three-quarters of the distance between the top and bottom of the main frame 124. The locking frame 130 has a crossbeam 170 that is attached to the main frame vertical beams 134 by a pair of hinge assemblies 172. The hinge assemblies 172 are attached to the top of the locking frame crossbeam so that the locking frame 130 pan be rotated upward against the vertical beams 134.

The locking frame 130 is provided with three tail frames 174 that each define a separate pair of tail openings 175 into which the tails of the skis are inserted to prevent them from swaying. The tail flames 174 are mounted perpendicularly to locking frame crossbeam 170 and are aligned under the pairs of support arms 142*a* and 142*b*, 142*c* and 142*d*, and 142*e* and 142*f* between which the skis are inserted. Each tail frame 174 includes a pair of frame arms 176, which are metal rods that are mounted perpendicularly to the locking frame 130. Mounted over each pair of frame arms 176 is an H-shaped sheath 178 formed of reinforced plastic or other resilient material that will not scratch the skis 122. Each sheath has a pair of parallel spaced-apart elongated sections 180 that cover the frame arms 176. Each sheath 178 further has a cross section 182 integral with the elongated sections 180 that bisects the tail opening 175 defined by the frame arms 176. A crossmember 184, formed of reinforced plastic or other appropriate material, is attached over the ends of each pair of frame arms 176. The crossmembers 184 are secured to the frame arms 176 by threaded fasteners or other appropriate means.

The locking frame crossbeam 170, the frame arms 176, the cross-sections 182, and the crossmember 184 define pairs of ski tail openings 175. When the ski boot portions of the skis 122 are placed between the support arms 142*a*, 142*b*, 142*c*, 142*d*, 142*e*, and 142*f*, the tails of the skis are inserted in the ski tail openings 175. The surrounding ski enclosure prevents the skis from swaying when they are being transported.

The mounting arms 132 are each formed with openings (not illustrated) to facilitate securing the arms to the clamps 63 and 64 that are respectively integral with the first and second support frame members 30 and 32. Specifically, each mounting arm 132 has two sets of openings to accommodate threaded fasteners 61 that secure the arm to clamp 63. A single pair of openings is provided to accommodate the threaded fastener 65 over which the arm 132 is inserted to secure the mounting arm 132 to the clamp 64. The mounting arms 132 are attached to the support frame members 30 and 32 in a manner identical to that of the bicycle support arms 34 of FIG. 1. The mounting arms are pivotally attached to support frame member 30 adjacent the vehicle and rotatably attached to support frame member 32 distal from the vehicle. This arrangement ensures that, when the support frame members are pivoted, the mounting arms 132, and the rest of the ski rack 120 will remain in the same orientation with respect to the ground surface.

The mounting arms 132 are mounted to the main frame vertical beams 134 by hinge assemblies 188. The hinge assemblies 188 are welded or otherwise secured to the vertical beams 134 at an appropriate location between the support frame 126 and the locking frame 130 such that, when the frame members 30 and 32 are locked against the vehicle, the skis 122 are spaced well above the ground and, when the frame members 30 and 32 are pivoted downward, the support frame 126 is at waist level to facilitate placement and removal of the skis. The hinge assembly 188 is arranged so that the mounting arms can be folded inwardly on each other when the ski rack 120 is not in use.

The ski rack 120 is also provided with a lockable plastic-coated cable 194 to prevent theft. One end of the cable 194 is looped around one of the main frame vertical beams 134 and the second end is wrapped around one of the support frame members 30 or 32 to prevent removal of the rack. In alternative embodiments of the invention, the second end of the cable may be passed through an opening in the crossbolt 42 that holds the support rack 10 to the vehicle 12. In these embodiments, the support rack 10 cannot be removed from the vehicle without first unlocking the cable 194.

The support rack 10 is used for transporting skis by substituting the ski rack 120 for the arms 34. The threaded fasteners 61 and 65 that hold the arms 34 or the ski rack mounting arms 132 are simply unscrewed and refastened to effect the substitution. Skis 122 are held by their toe clips in the support frame 126. The locking frame 130 prevents the skis from swaying when they are being transported. The skis 122 are in the up position away from the roadway when they are being transported and are pivoted downward for placement in and removal from the rack. Thus, the skis 122 will not be damaged by rocks and pebbles that are thrown upward by the vehicle 12 and are easily accessible when their placement and removal from the ski rack 120 is desired. The ski rack 120 is shifted from the placement/removal position to the transport position in a manner identical to movement of the bicycle support arms 34, as described with reference to FIG. 6. The ski rack 120, like the bicycle support arms 34, maintains its orientation to the ground surface when shifted between the placement/removal and transport positions.

The hinge assemblies 140, 172, and 188, that respectively connect the support frame 126, the locking frame 130, and the mounting arms 132 to the main frame, allow the ski rack 120 to be folded flat when it is not in use, as depicted in FIG. 8. This facilitates storage of the ski rack 120 in a minimal amount of space. The lock 160 and the locking cable 194 and the locking members 192 prevent the unauthorized removal of the skis or the ski rack 120.

Figure 9:
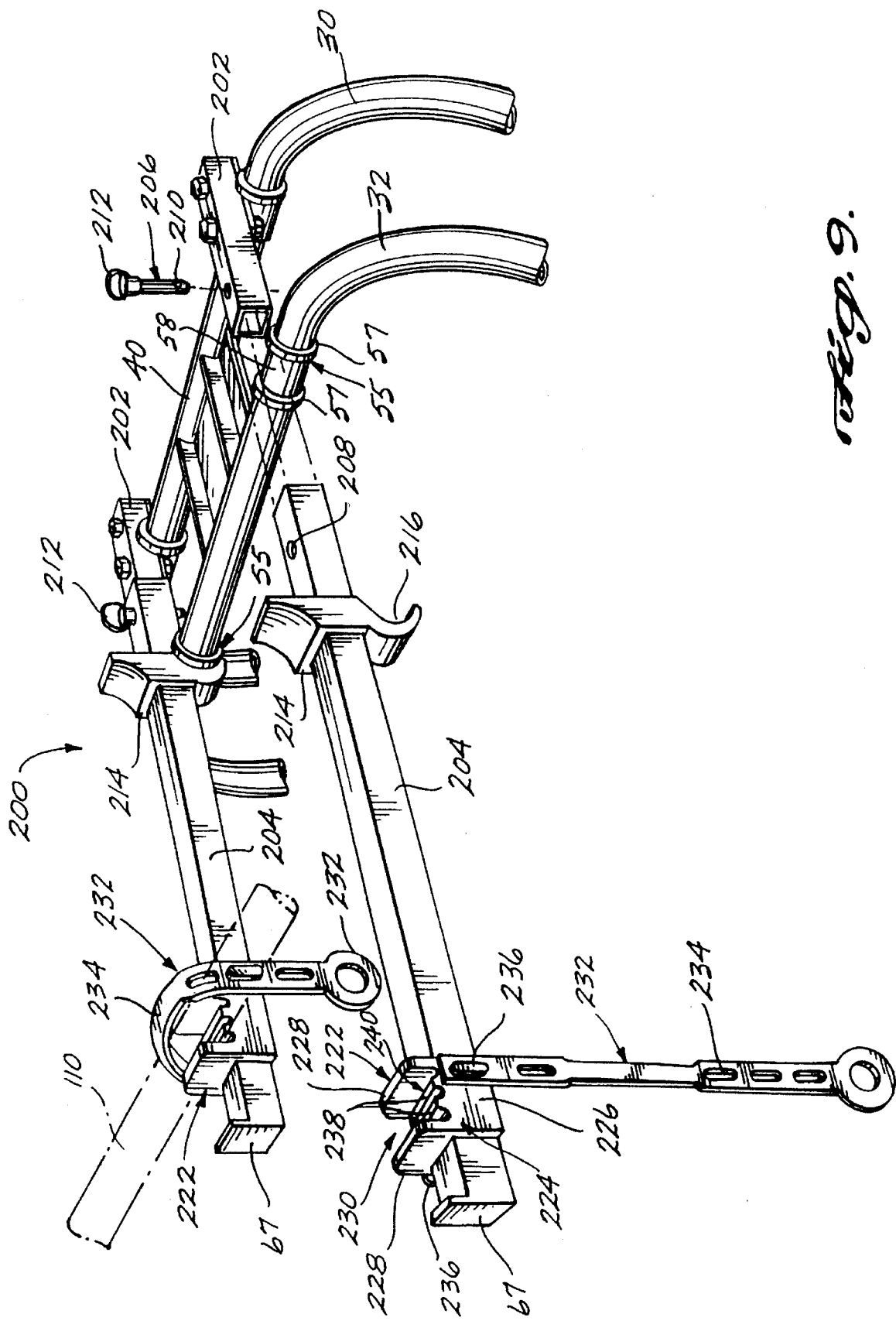
FIG. 9 is a perspective view of a releasable mounting arm system of an alternative embodiment of this invention showing the releasable arms both connected to and disconnected from the support rack of this invention and the bicycle support arms in both the attached and disconnected states.

Alternatively, in still other embodiments of the invention, the bicycle support arms on the ski rack may be mounted to the frame members 30 and 32 using the attachment assembly 200 depicted in FIG. 9. The assembly 200 includes attached mounting arms 202 and releasable mounting arms 204 that substitute for the bicycle support arms 34 (FIG. 1) or ski rack mounting arms 132 (FIG. 7). Each attached mounting arm 202 is pivotally secured to a crossmember bushing 55 coupled over a first frame member 30 top rail 54. Each releasable mounting arm 204 is dimensioned to be coupled over the free end of an attached mounting arm 202.

The attached mounting arm 202 and releasable mounting arm 204 are selectively secured together by a detent pin 206 that is inserted through concentric openings 208 formed in each pair of interlocking arms. The tip of each detent pin 206 is provided with a biased bearing 210 that locks the pin in place. The opposite ends of the pins 206 are provided with a pull ring 212 to facilitate their installation and removal.

When the arms 202 and 204 are secured together, the releasable mounting arms 204 are seated in the saddles 58 of the bushings 55 located around the second frame member 32. A fastener member 214 mounted over each releasable mounting arm 204 holds each arm 204 in place. Each fastening member 214 is formed of reinforced plastic and is secured to the associated releasable mounting arm 204 by an appropriate fastener. Each fastening member 214 includes a hook 216 positioned to abut the associated second frame member bushing 55 below the releasable mounting arm 204. The hook 216 thus prevents vertical movement of the releasable mounting arm 204 as could otherwise happen when the vehicle 12 is in motion. Horizontal shifting of the releasable mounting arm is restricted by the hook 214 and the bushing lips 57 that define the saddles 58.

Each fastening member 214 is further provided with a stop 218 that extends upward opposite the hook 216. The stop 218 restricts movement of bicycles toward the frame members when the releasable mounting arms 204 are used to support the bicycles.

Attachment assembly 200 provides a quick means for configuring the support rack 10 between the bicycle-carrying and ski-carrying modes. Different sets of releasable mounting arms 204 are designed to serve as bicycle support arms 34 or ski rack mounting arms 132. The depicted mounting arms 204 are designed to function as bicycle support arms and are dimensioned to support one or more bicycles thereon. The free ends of these mounting arms 204 are provided with stop plates 67 to block rearward movement of bicycles. Releasable mounting arms that function as ski rack mounting arms are attached to the ski rack main frame 124 (FIG. 7) in a manner identical to the attachment of the ski rack mounting arms 132 of the described ski rack.

The different sets of releasable mounting arms 204 can readily be interchanged by: removing the detent pins 206; pulling the first set of arms 204 away from the fixed mounting arms 202; coupling the new mounting arms in place over the fixed mounting arms; and, reinserting the detent pins. Attachment assembly 200 thus allows for quick reconfiguration of the support rack 10 without having to loosen and resecure threaded fasteners or other difficult fastening means.

Also illustrated in FIG. 9 are a pair of mounting saddles 222 that are used to secure a bicycle 110, shown partially in phantom, to the support rack. Each mounting saddle 222 is formed of a single section of hardened rubber or reinforced plastic and is attached to a support arm 204. Each mounting saddle 222 has a base section 224 positioned on top of the associated arm. A pair of opposed flanges 226 extend downward from the base section 224 along the side of the arms 202 and 204, and are dimensioned to secure the saddle to the mounting arm by a friction fit. A pair of opposed flanges 228 extend upward from the base 224 across the mounting arm and project upward to define a seating space 230 in which the top tube of the bicycle 110 is disposed.

The bicycle 110 is held in the mounting saddles 222 by elastic straps 232 that are attached to the saddles. Each strap 232 is provided with a number of elongated openings 234 so that the strap can be secured to complementary cleats 236 formed integrally with the mounting saddles 222. Each saddle base 224 is formed with a pair of spaced-apart elongated ridges 238 that extend into and across the seating spaces 230. Each ridge 238 has an inwardly beveled top surface 240 on which the bicycle 110 top tube rests. The opposed ridge top surfaces 240 define a cradle that limits the sway of the bicycle 110.

Figure 10:
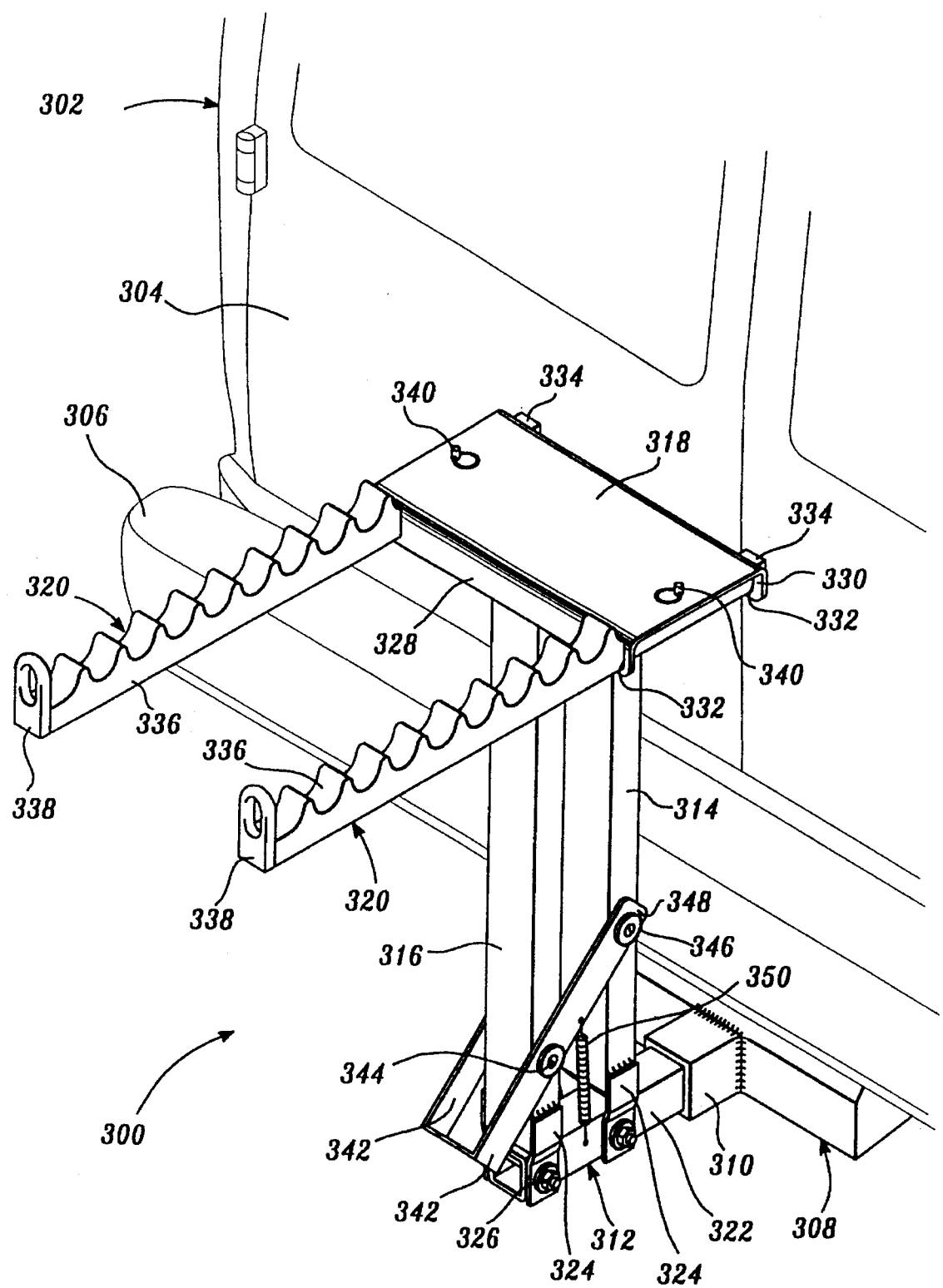
FIG. 10 is an isometric view of a preferred rack of the present invention, having two upwardly extending beams.

Another preferred embodiment of the present invention will now be described with reference to FIGS. 10–12. Referring first to FIG. 10, a support rack 300 is provided for preferably carrying bicycles on the rear of a vehicle 302. Rack 300 provides the same advantages as discussed above with reference to rack 10, in that rack 300 is articulated such that it can move away from the rear end of the vehicle, while still holding bicycles, such that the doors 304, lift gate, tailgate, or other rearward access structures can be used. Vehicle 302 also includes a bumper 306 below which a receiver hitch 308 is attached to the frame of the vehicle. Receiver hitch 308 may be similar to that discussed above, and includes a hitch sleeve 310. Note that, while receiver hitch 308 is the preferred place to which rack 300 is mounted, other mounting means may be used to attach rack 300 to the rear of vehicle 302.

Rack 300 includes a base member 312, a forward beam 314, a rearward beam 316, a top member 318, and support arms 320. When coupled to receiver hitch 308, base member 312 is in a substantially horizontal position and extends in a longitudinal direction with respect to vehicle 302 rearward of receiver hitch 308. Base member 312 includes a tongue 322 that is slidably engaged within hitch sleeve 310 in a manner discussed above with reference to rack 10. Base member 312 is constructed of a tube with a square cross-sectional shape having a width only slightly less than the inside width of hitch sleeve 310. The length of base member 312 is sufficient to extend within hitch sleeve 310 for attachment thereto and rearward of hitch sleeve 310 beyond bumper 306.

Forward and rearward beams 314 and 316 are also constructed of tubular metal. The cross-sectional shape of beams 314 and 316 is rectangular with the major axis of the cross section being transverse to the longitudinal axis of vehicle 302. Beams 314 and 316 extend in a generally upward direction from their pivotal attachments to base member 312. The bottom ends of beams 314 and 316 have beam connection plates welded thereto. Beam connection plates 324 each include two flat portions and an inwardly angled center portion. The upper flat portions of beam connection plates 324 are welded to the lateral sides of beams 314 and 316. The lower portions of beam connection plates 324 are pivotally secured with fasteners 326 to base member 312. Fasteners 326 may be standard bolts with nuts and washers attached to allow pivotal movement of beam connection plates 324 relative to base member 312. A beam connection plate 324 is attached to each side of beams 314 and 316, and a bolt passes through plates 324 and through base member 312.

The top ends of beams 314 and 316 are pivotally secured to top member 318, as explained in more detail below, with reference to FIGS. 11 and 12. The space between the top pivotal connections of beams 314 and 316 is equal to the spacing between the bottom pivotal connections of beams 314 and 316 to base member 312. Thus, a four-bar linkage results with the bars being base member 312, forward and rearward beams 314 and 316, and top member 318. Since a parallelogram four-bar linkage is constructed, and since top member 318 lies in a generally horizontal plane, as beams 314 and 316 pivot rearwardly about base member 312, top member 318 maintains its horizontal orientation, while moving rearwardly and downwardly relative to vehicle 302. This motion can be seen with more clarity with reference to FIGS. 11 and 12.

Top member 318 includes a top flat plate-like portion, which is in a generally rectangular configuration, with a major axis transverse to the longitudinal axis of vehicle 302. A rearward flange 328 is formed along the rearward side of top member 318 and projects downwardly therefrom. A forward flange 330 likewise projects downwardly from the forward edge of top member 318. Arm apertures 332 are provided at both ends of both flanges 328 and 330. Arm apertures 332 are preferably square and hold support tubes 334 therein. Support tubes 334 are the main structural components of support arms 320. Support tubes 334 are preferably square in cross section and extend in a longitudinal direction from top member 318. The rearward ends of support tubes 334 are slidably received within arm apertures 332 such that only a small portion of support tubes 334 extends forward of forward flange 330. Ribbed covers 336 are preferably secured around the portions of support tubes 334, which project rearwardly of rearward flange 328. Ribbed covers 336 are made of a soft, rubber-like material such that they will not mar the surface of any bicycles held thereon. Covers 336 include upwardly projecting bumps that hold bicycles in defined locations along support arms 320. As with the embodiments discussed above, support arms 320 include stop plates 338 at their rearwardmost ends. Stop plates 338 include apertures through which a lock or other tie-down member may be secured. Stop plates 338 project upwardly from support tubes 334. Holes are provided at corresponding locations in top member 318 and the forward ends of support tubes 334 to receive detent pins 340. Pins 340 include rings on their ends and ensure that support arms 320 remain in place within arm apertures 332.

Lock arms 342 are provided to hold forward and rearward beams 314 and 316 in an upright position until the user desires to lower support arms 320. Lock arms 342 are L-shaped arms with the lower portions of the arms extending inwardly toward each other and the upper portions of the arms being connected to first rearward beam 316 and then at the uppermost end, forward beam 314. A pivot fastener 344 secures each of lock arms 342 to rearward beam 316 near the center of lock arms 342. Pivot fastener 344 is preferably a bolt that extends through rearward beam 316 and includes spacers with large flanges and a lock nut at its outer end to allow lock arms 342 to freely pivot. A lock fastener 346 is secured to forward beam 314 at the upper end of lock arms 342. Lock fastener 346 is similarly attached through forward beam 314 and includes spacers with flat heads (flanges) to provide a location for the end of lock arms 342 to rest and secure beams 314 and 316 from movement. A lock notch 348, best seen in FIG. 12, is cut within the lower side of the upper end of lock arms 342. Lock notch 348, when beams 314 and 316 are in upright positions, rests over lock fastener 346. Cylindrical helical springs 350 are attached between lock arms 342 and base member 312. The upper ends of springs 350 are secured between pivot fastener 344 and lock fastener 346, while the lower ends are secured between the connections of beam connection plates 324 on each side of base member 312. Spring 350 biases the upper end of lock arms 342 in a downward direction such that lock notches 348 remain secure over lock fastener 346.

Figure 11:
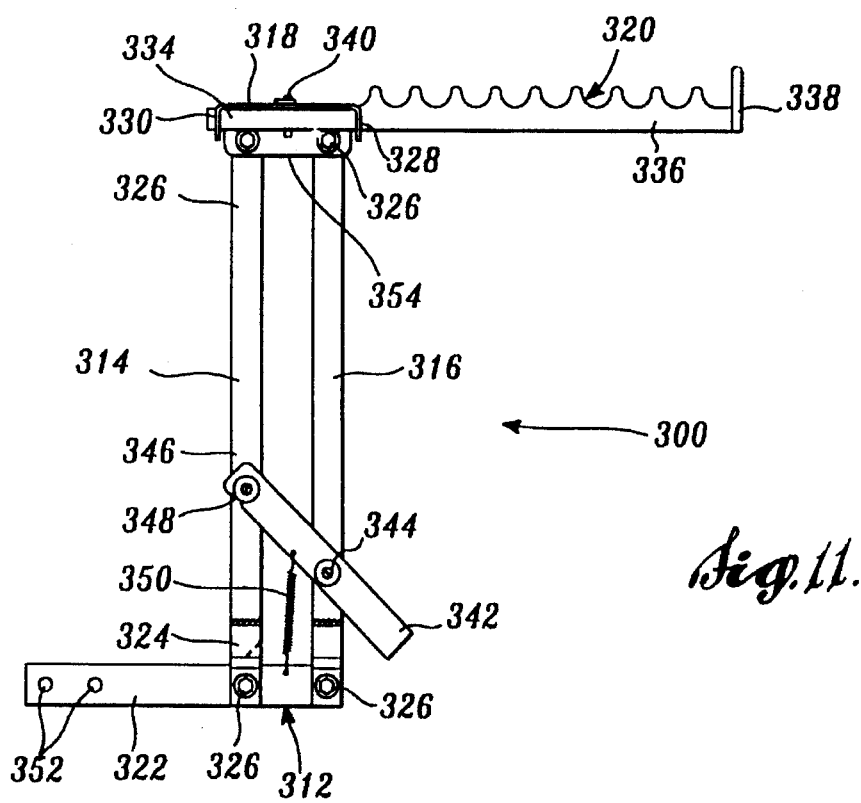
FIG. 11 is a side elevational view of the rack illustrated in FIG. 10 shown in an upright position.
Figure 12:
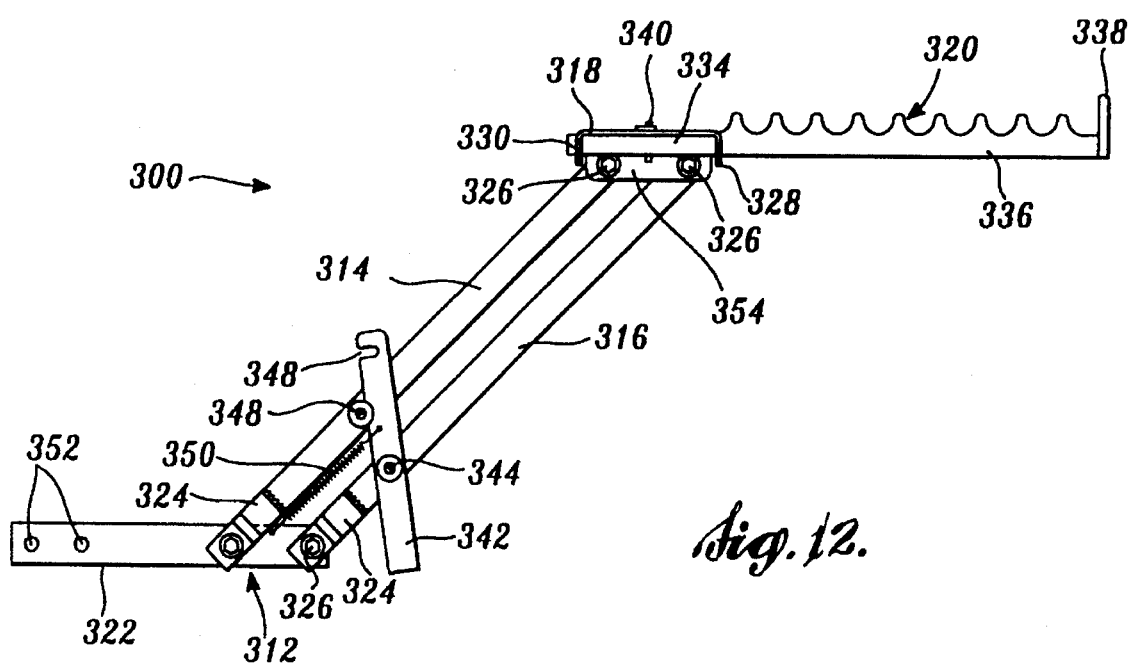
FIG. 12 is a side elevational view of the rack illustrated in FIG. 10 shown in a lowered position.

FIGS. 11 and 12 illustrate the movement of rack 300 from an upright position adjacent the rear doors 304 of vehicle 302 to a lowered position out of the way of doors 304, such that they may be opened without rack 300 interfering with their movement. This movement is also essential for the opening of other vehicles, which may include lift gates, tailgates, or other rearwardly opening structures. Further details of rack 300 are also better illustrated in FIGS. 11 and 12. Bolt apertures 352 are shown in tongue 322. Bolt apertures 352 perform the function of securing tongue 322 to sleeve 310, as explained above with reference to FIGS. 2-4. Beam top mounts 354 are also illustrated. Beam top mounts 354 are downward projections welded to the underside of top member 318. Beam top mounts 354 provide locations to which beams 314 and 316 may be secured at their upper ends. As discussed above, the space between the attachments of forward and rearward beams 314 and 316 to beam top mounts 354 is equal to the spacing between the lower ends of beams 314 and 316 to base member 312. Beam top mounts 354 are generally rectangular in shape and lie within parallel vertical planes separated by a distance slightly greater than the width of beams 314 and 316.

To move support arms 320 from their uppermost position as illustrated in FIG. 11 to their lowered position as illustrated in FIG. 12, the user simply grasps support arms 320 and pushes slightly in a forward direction while pushing down on the lower ends of lock arms 342 with his or her foot. Only slight forward movement is required since lock fastener 346 simply needs to be freed from lock notch 348 as the upper ends of lock arms 342 swing upwardly against the biasing force of springs 350. Once this occurs, the user can pull support arms 320 rearwardly and allow lock arms 342 to glide along lock fastener 346 while support arms 320 move rearwardly and downwardly with the pivotal movement of beams 314 and 316. As explained above, support arms 320 retain their horizontal orientation at all times due to the parallelogram four-bar linkage configuration of beams 314 and 316, base member 312, and beam top mounts 354. Thus, the bicycles being carried on support arms 320 retain their position with respect to support arms 320 at all times. Therefore, the bicycles need not be removed from rack 300 and are not scraped or damaged in any way. Once the lower end of forward beam 314 contacts the top surface of base member 312, downward movement of support arms 320 stops. The user can now freely open the rear end of vehicle 302 and have easy access thereto.

To resecure rack 300 in its upright position near the rear end of vehicle 302, the user simply pushes forwardly and upwardly on support arms 320 such that beams 314 and 316 swing toward vehicle 302. This movement continues until notch 348 is pulled over lock fastener 346 by spring 350. The user can then pull slightly rearwardly on support arms 320 to securely fit lock fastener 346 within the uppermost part of lock notch 348. Since lock arms 342 are not perpendicular to beams 314 and 316, they impede any movement once they are secured to both pivot fastener 344 and lock fastener 346. The separation of lock arms 342 from one another (i.e., the fact that they are not connected at their lowermost ends), provides a factor of safety, since both lock arms 342 would have to be simultaneously released in order for any movement of rack 300 to take place relative to receiver hitch 308. However, the lower ends of lock arms 342 are angled inwardly such that the user may release the arms simply by the application of one foot to the lower ends of the arms.

Figure 15:
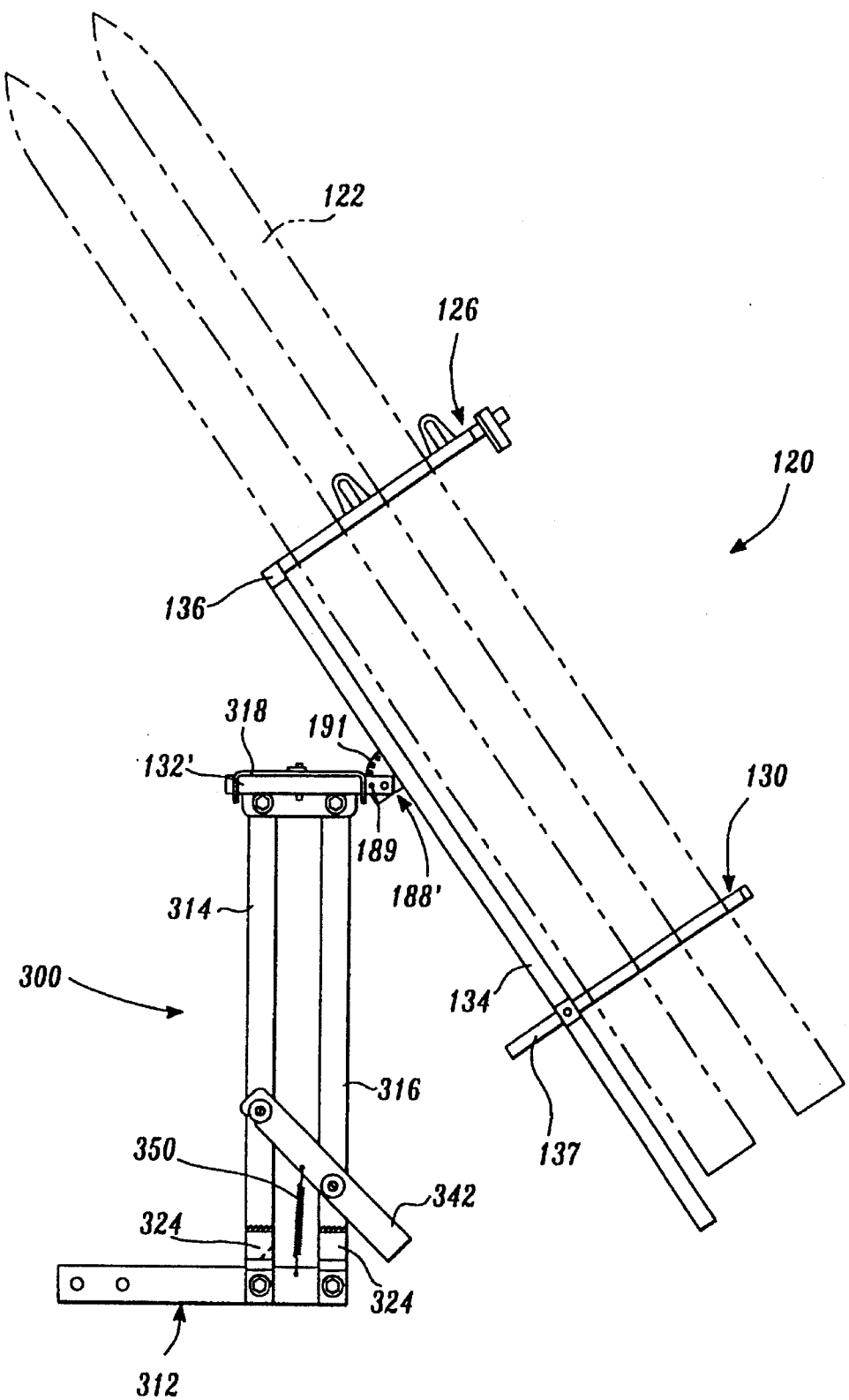
FIG. 15 is a side elevational view of the rack illustrated in FIG. 13 in an upright position with the ski rack tilted.

Referring now to FIGS. 13-15, the attachment of a ski rack 120 to support rack 300 will now be described. Ski rack 120 is similar in most all details to ski rack 120 described above, except for minor modifications to mounting arms 132 and hinge assemblies 188. Therefore, in this embodiment, mounting arms will be referred to as mounting arms 132' and hinge assemblies will be referred to as hinge assemblies 188'. The details of ski rack 120 besides these elements are the same as those discussed above with reference to FIGS. 7-9. In this embodiment, illustrated in FIGS. 13-15, mounting arms 132' extend from hinge assemblies 188' in a rearward direction through arm apertures 332 in a manner similar to the attachment of support arms 320 to top member 318. Detent pins 340 are secured through top member 318 and mounting arms 132'. The rearward ends of mounting arms 132' are secured in any standard fashion, such as by welding or other fasteners to main frame 124.

In one alternate embodiment of ski rack 120 hinge assemblies 188' are used. Hinge assemblies 188' include flat plates that are welded to main frame 124 and include pin apertures 191 spaced radially from the hinge point of mounting arms 132'. Lock pins 189 are used to secure the position of main frame 124 relative to mounting arms 132'. Main frame 124 is pivoted about its connection to mounting arms 132' until one of the pin apertures 191 is aligned with the pin aperture in mounting arms 132'. At this point, lock pin 189 may be inserted to secure main frame 124 against rotation relative to mounting arms 132'. Thus, as illustrated in FIG. 14, support rack 300 may be moved away from the rear end of vehicle 302 to allow access while ski rack 120 maintains its vertical orientation.

Alternatively, as illustrated in FIG. 15, ski rack 120 may be angled such that the tips of skis 122 are closer to vehicle 302. In the preferred embodiment, three different settings are achievable. However, any number of settings may be used by simply constructing hinge assembly 188' with more pin apertures 191 or with any other means to clamp hinge assembly 188' to mounting arms 132'.

One other feature of ski rack 120 shown here that is slightly different from that discussed above is the provision of rack spacer 137. Rack spacer 137 projects forwardly from the forward end of locking frame 130 such that it contacts rearward beam 316 when ski rack 120 is in a vertical position and support rack 300 is also in an upright position. Rack spacer 137 provides a second contact point to ensure that the torsional forces at the rearward end of mounting arms 132' do not cause movement of ski rack 120 relative to mounting arms 132'.

Figure 16:
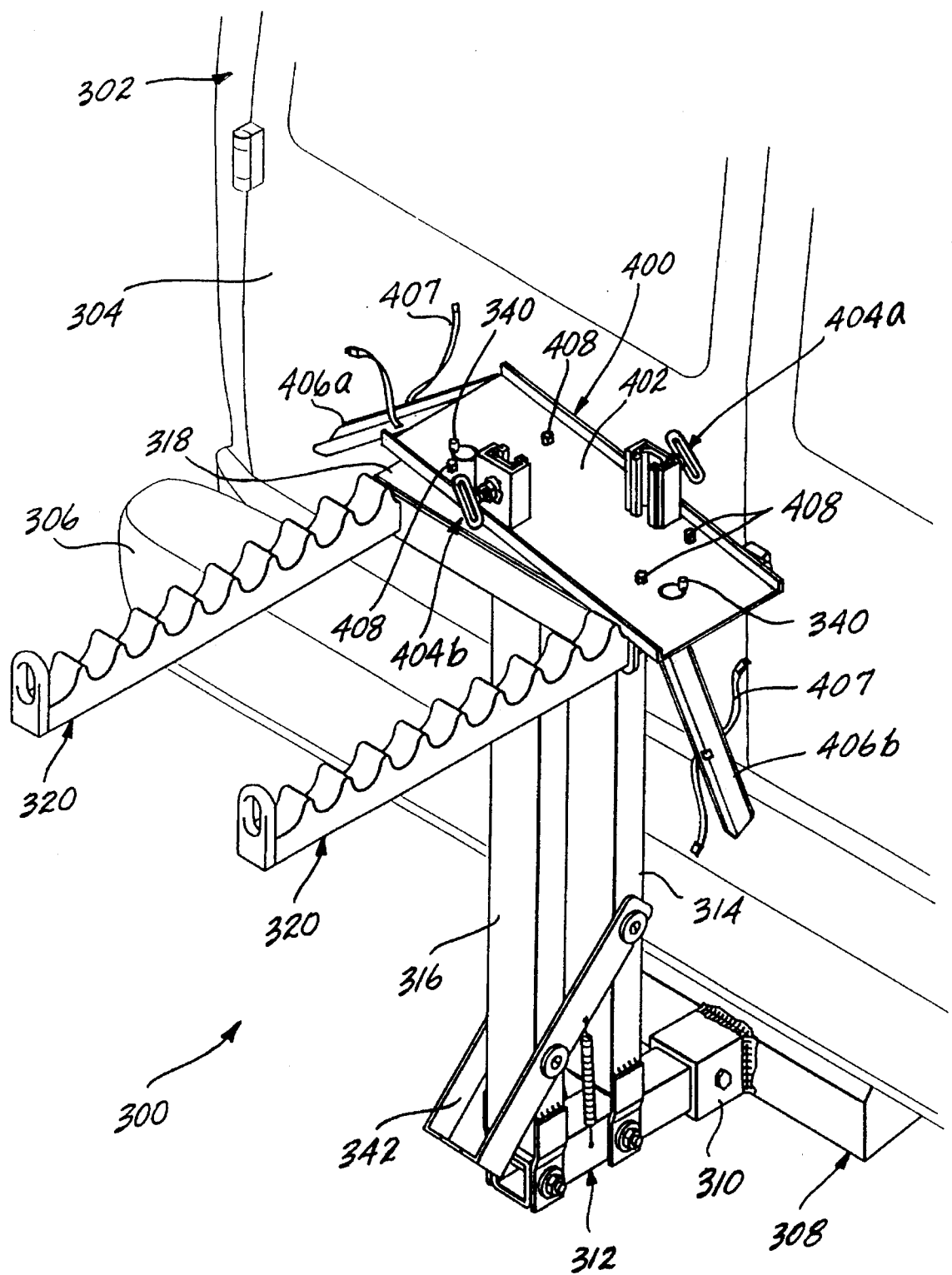
FIG. 16 is a perspective view of the rack illustrated in FIG. 10 having a crank clamp attachment secured to the top thereof.
Figure 17:
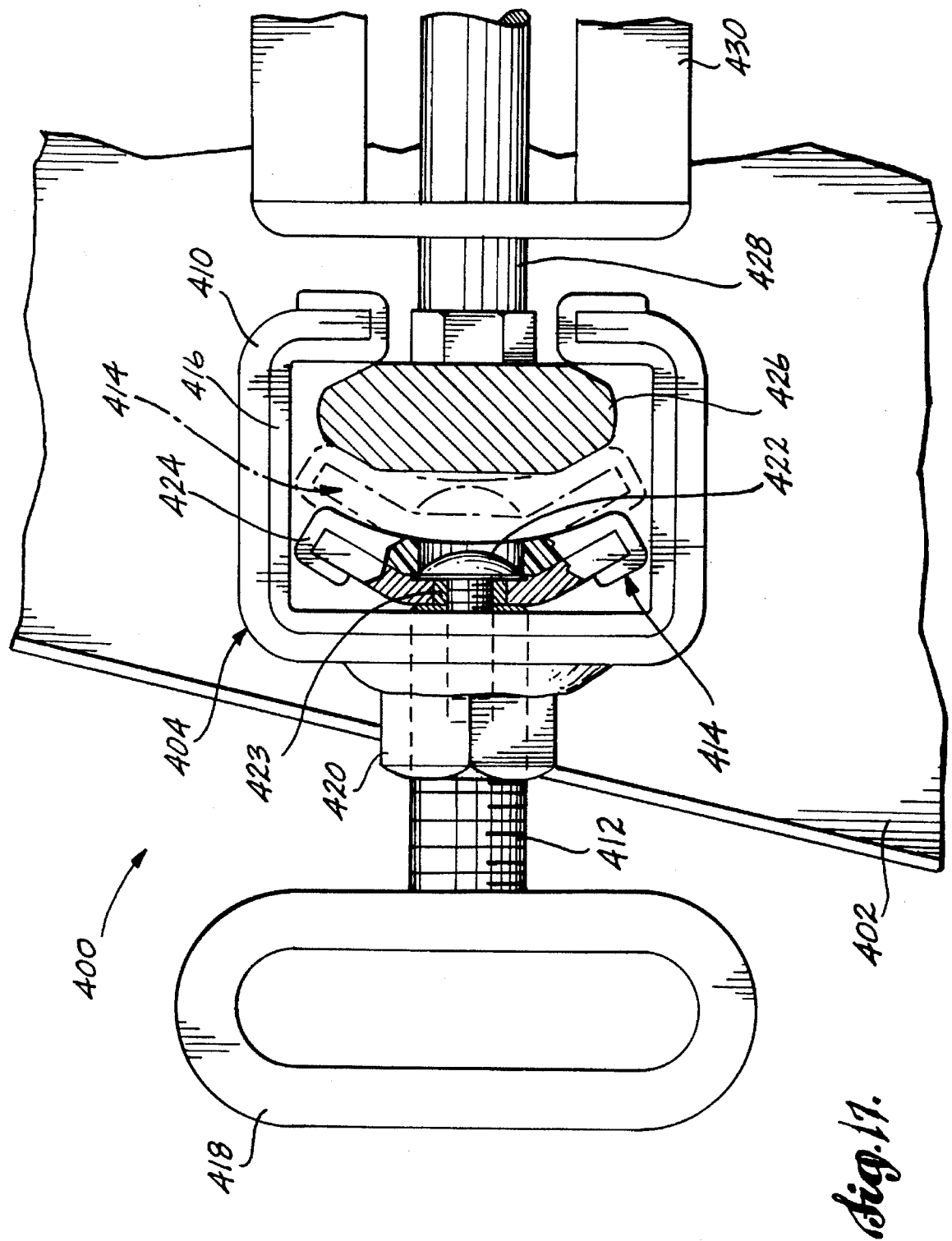
FIG. 17 is a top view of a crank clamp illustrated in FIG. 16.
Figure 18:
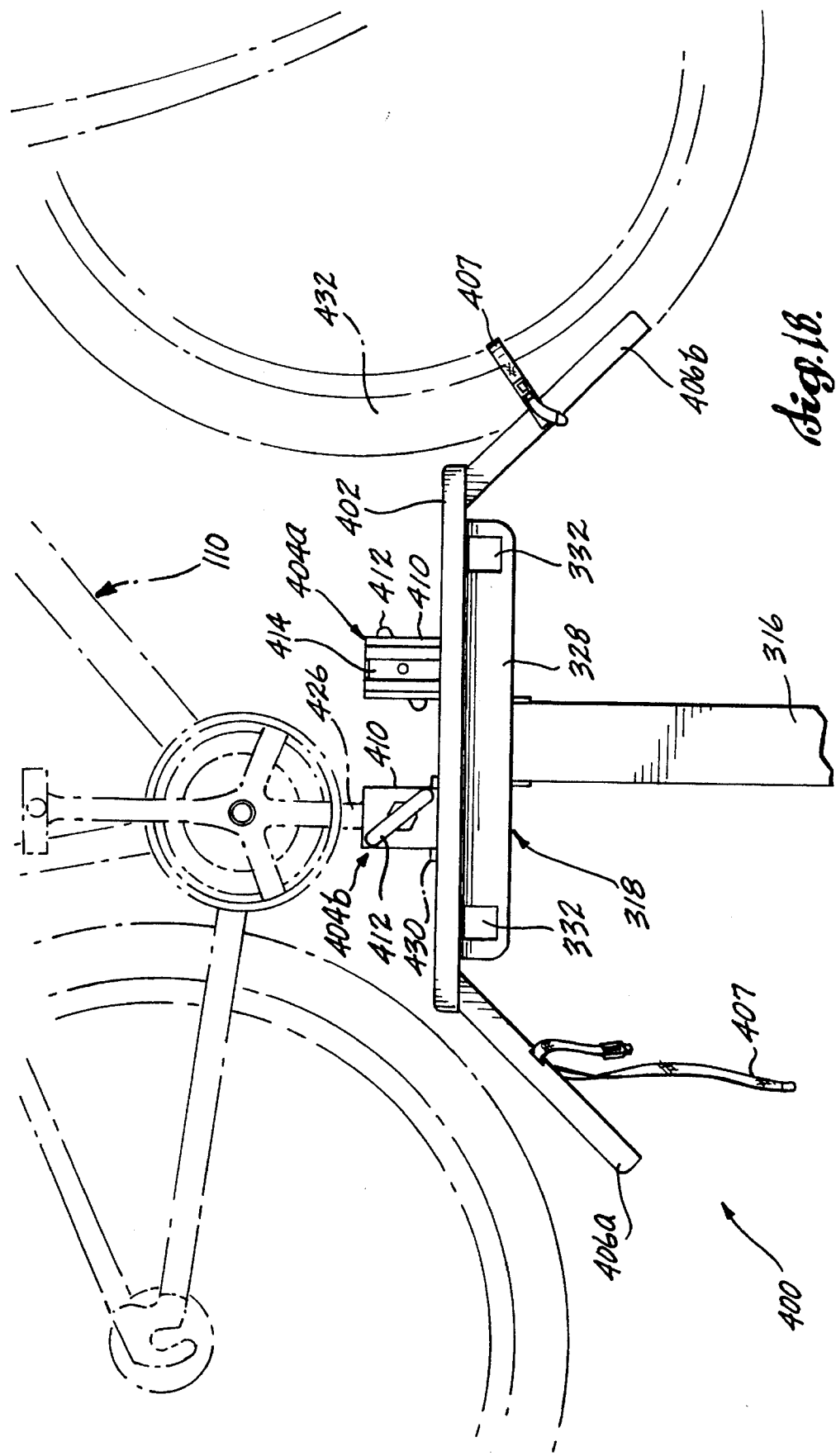
FIG. 18 is a rear elevational view of the rack illustrated in FIG. 16 having a bicycle held by one of the crank clamps and having the support arms removed.

A further aspect of the present invention including three different embodiments, will now be described with reference to FIGS. 16-20. Referring first to FIGS. 16-18, a crank clamp attachment 400 is provided that attaches to the top surface of top member 318 of rack 300. Crank clamp attachment 400 allows rack 300 to carry, in the preferred embodiment, two additional bicycles. Crank clamp attachment 400 includes a support plate 402, crank clamps 404a and 404b, and wheel rails 406a and 406b. Support plate 402 is in the shape of a parallelogram with the lateral sides being substantially collinear with the lateral sides of top member 318. Support plate 402 rests directly on top of top member 318. The forward and rearward sides of support plate 402 run at slight angles to the forward and rearward sides of top member 318. Thus, the left forward corner of support plate 402 extends forward of the left forward corner of top member 318 and the right rearward corner of support plate 402 extends rearwardly of the right rearward corner of top member 318. The forward and rearward sides of support plates 402 include upwardly turned flanges. Crank clamp 404a is welded to the top surface of support plate 402 near the forward edge of support plate 402 just to the right of center. The position of crank clamp 404b is the mirror image of the position of crank clamp 404a. Thus, crank clamp 404b is positioned near the rearward edge of support plate 402 just to the left of center.

Wheel rail 406a is secured to the left forward corner of support plate 402. Wheel rail 406b is secured to the right rearward corner of support plate 402. Both rails are constructed of angled metal that is welded directly to the bottom surface of support plate 402. Wheel rails 406a and 406b extend outwardly and slightly downwardly from the corners of support plate 402. Straps 407 are secured to wheel rails 406a and 406b for securing a bicycle wheel 432. Preferably, the front wheel of a bicycle is secured within each of wheel rails 406a and 406b.

Fasteners 408 extend through support plate 402 and top member 318 to secure crank clamp attachment 400 to rack 300. Preferably, four fasteners 408 are used.

The details of crank clamps 404a and 404b can best be understood with reference to FIG. 17. Crank clamps 404a and 404b include clamp housings 410, clamp screw 412, and clamp head 414. Clamp screw 412 includes a threaded portion and a handle 418, which is used to advance or retract the screw 412 relative to clamp housing 410. Clamp housing 410 has a cross-sectional C shape that projects vertically upward from support plate 402. A housing liner 416 is held around the inner surfaces of clamp housing 410. Housing liner 416 provides a nonabrasive surface to which a crank arm 426 may be secured. A nut 420 with internal threads is welded to the back side of housing 410 for engaging screw 412. Clamp head 414 is disposed within clamp housing 410 on the end of screw 412. A head screw 422 extends through clamp head 414 and into the end of screw 412. Clamp head 414 has a slightly curved shape to cup crank arm 426 and curve around its contours. A head liner 424 is provided on the inwardly facing surface of clamp head 414 to provide an interface between clamp head 414 and crank arm 426.

As illustrated in FIG. 17, crank arm 426 extends downwardly within the upwardly projecting clamp housing 410 with its pedal shaft 428 extending between the ends of the C-shaped housing. The ends of the "C" are thus too close together to allow crank arm 426 to move horizontally but are far enough apart to allow pedal shaft 428 to be disposed therebetween. Pedal 430 thus resides on the outside of clamp housing 410 adjacent the opening. Clamp head 414 is screwed into position to engage crank arm 426 and lock it against housing 410 for secure attachment of bicycle 110 (as shown in phantom).

FIG. 18 illustrates the attachment of bicycle 110 to crank clamp attachment 400. Bicycle 110 is lifted and crank arm 426 is placed within the top of clamp housing 410. FIG. 18 illustrates a bicycle 110 being secured within the rearwardmost crank clamp 404b. The forward or left crank arm 426 is placed within crank clamp 404b such that the bicycle 110 is further removed from crank clamp 404a so that, when two bikes are loaded onto crank clamp attachment 400, no interference between the two exists. Bicycle wheel 432, preferably the front wheel, is placed within the "V" of wheel rail 406b. Strap 407 is then secured around the rim of bicycle wheel 432. Clamp screw 412 is then tightened by rotating handle 418 to secure clamp head 414 against crank arm 426. Crank clamp attachment 400 is then ready to transport bicycle 110 or to receive another bicycle to be secured to crank clamp 404a and wheel rail 406a. Either bike can be loaded first, since rack 300 can be lowered for easy access to the inside bike. Since crank clamp 404b securely holds crank arm 426 from movement in any direction, be it lateral, longitudinal, or vertical, bike 110 remains secure by one more attachment point to wheel 432 with strap 407. The only movement of bicycle 110 without the attachment to wheel 432 would be rotational movement about the bottom bracket. However, with bicycle wheel 432 secured to rail 406b the entire bicycle is secure against movement.

The attachment of crank clamp attachment 400 to the top of top member 318 allows rack 300 to carry two additional bicycles. These bicycles are carried forward of the bicycles carried on arms 320 and, thus, the torque of base member 312 is kept to a minimum. Also, if a van or sport/utility type of vehicle is used, the tops of bicycles 110 loaded on crank clamp attachment 400 may extend only slightly above the top of vehicle 302. Thus, all bicycles are kept within the rearward draft zone of vehicle 302 for minimal wind resistance.

Figure 19:
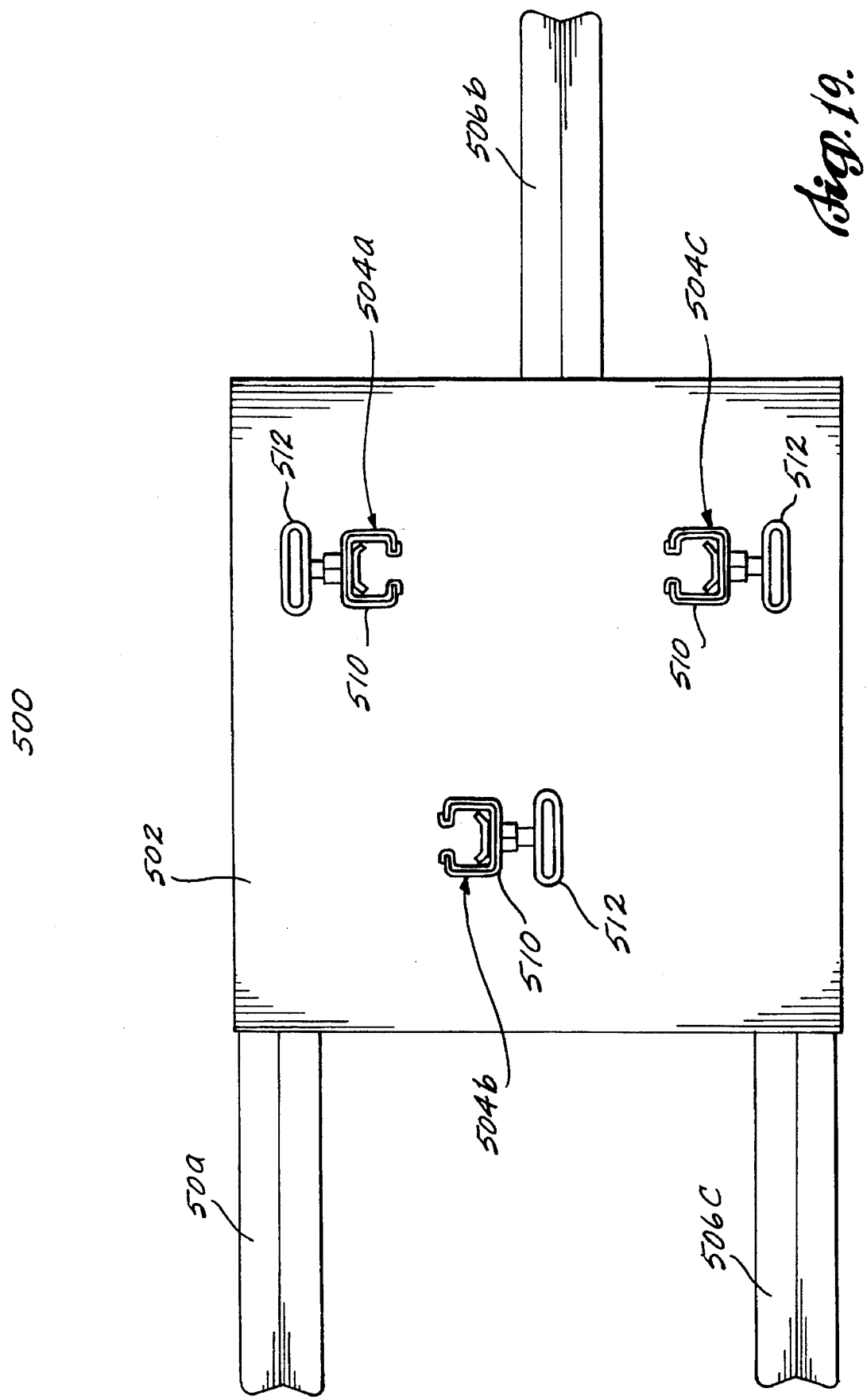
FIG. 19 is a top view of an alternate embodiment of the crank clamp attachment having three clamps.

An alternate embodiment of crank clamp attachment 500 is illustrated in FIG. 19. This embodiment includes three crank clamps 504a–504c. Clamps 504a and 504b are similar to 404a and 404b and wheel rails 506a and 506b are similar to wheel rails 406a and 406b. However, crank clamp attachment 500 is extended rearwardly such that an additional-crank clamp 504c is provided to secure one additional bicycle thereon. An additional wheel rail 506c is also provided. In this embodiment, two bicycles face one direction while one bicycle meshes between the two to face the opposite direction. Crank clamp 504c faces the same direction as crank clamp 504b but is spaced farther from crank clamp 504b than crank clamp 504b is spaced from crank clamp 504a. Note that support plate 502 could be further extended and additional clamps added for transporting additional bikes.

Figure 20:
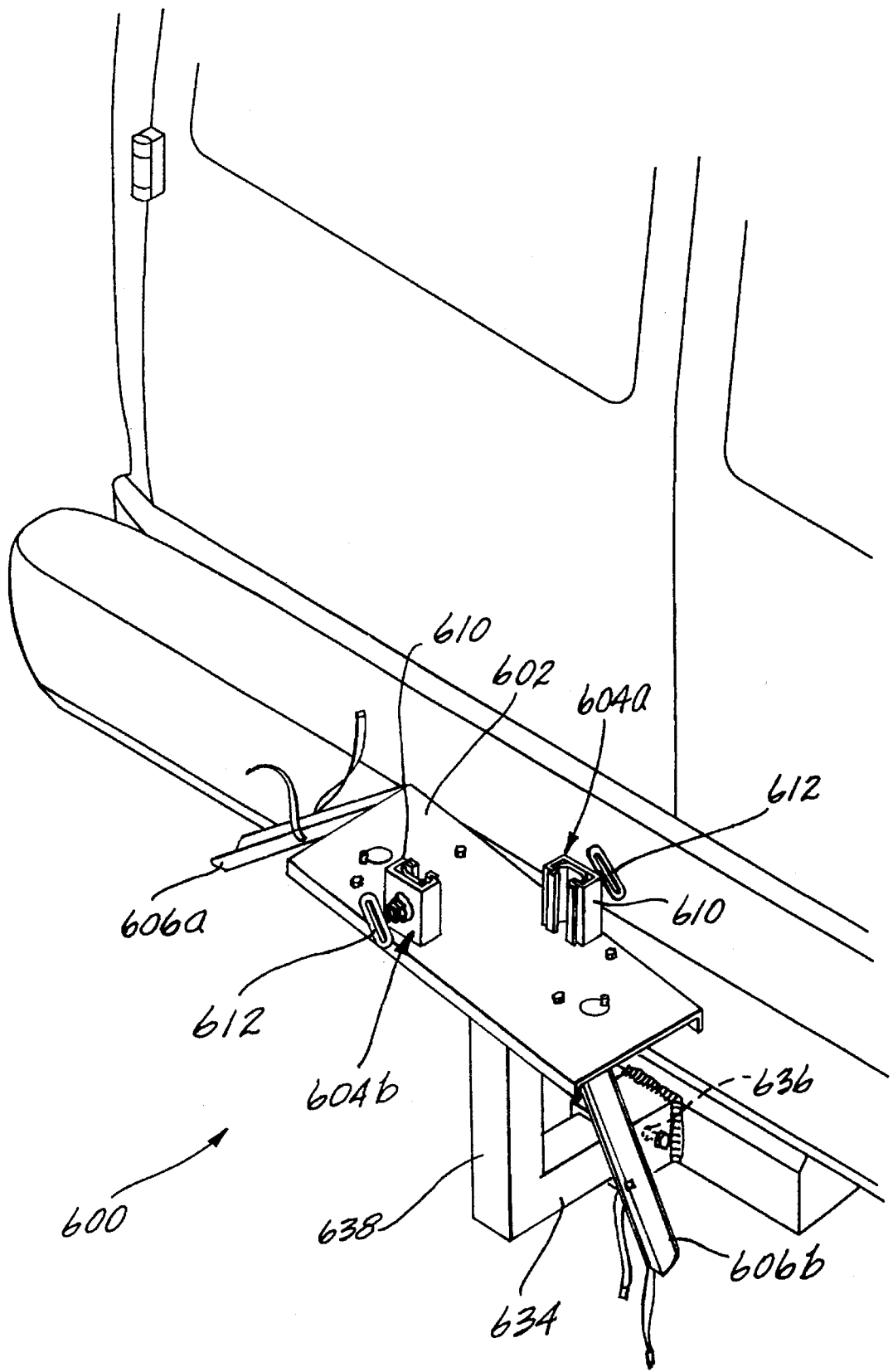
FIG. 20 is a perspective view of an alternate embodiment of the crank clamp attachment mounted to a simplified base structure.

Another alternate embodiment is illustrated in FIG. 20. A low rack 600 is provided that includes a bike rack attachment that is nearly identical to crank clamp attachment 400. Low rack includes a support plate 602, crank clamps 604a and 604b, and wheel rails 606a and 606b. Each crank clamp includes a clamp housing 610 and a clamp screw 612. However, the bottom of support plate 602 is secured to an upright beam 638. Upright beam 638 extends downwardly from support plate 602 a short distance and is welded or otherwise connected to base member 634. Base member 634 is constructed similar to base member 312 and slides within sleeve 310 of receiver hitch 308. Bolt apertures 636 are provided to secure base member 634 to sleeve 310. Upright beam 638 does not articulate or otherwise move relative to base member 634. Since the bicycles held on low rack 600 are held in a higher position than those held on support arms 320, the height of upright beam 638 does not need to be as great as that of beams 314 and 316.

Low rack 600 provides an inexpensive and simpler alternative to other racks provided. Bicycles may be easily loaded and removed as described above with reference to FIG. 18. Low rack 600 is small and lightweight enough to be easily removed and replaced from receiver hitch 308.

While preferred embodiments of the invention have been described in the context of loading and unloading a bicycle on a van, it is to be understood that the present invention will have other applications, such as on campers, or with the loading and unloading of minibikes, motorcycles, or other equipment or cargo. Furthermore, it is contemplated that various changes may be made thereto without departing from the spirit and scope of the invention. For instance, a spring-biased hook-type latch may be used to secure the beams in an upright position. Moreover, alternative embodiments of the crank clamp attachment are, of course, possible. For example, it may be desirable to provide support plate 402 with a second wheel support structure similar to the front wheel rails 406 described above. Consequently, the invention can be practiced otherwise than as specifically described herein.

The embodiments of the invention in which an exclusive property or privilege is claimed are defined as follows:

1. A support rack for carrying articles behind a vehicle having a forward end and a rearward end, the rack comprising:

(a) a base member securable to the rearward end of the vehicle to project rearwardly from the vehicle;

(b) a forward beam including a first pivotal connection to said base member and projecting upwardly therefrom;

(c) a rearward beam including a second pivotal connection to said base member and projecting upwardly therefrom, said rearward beam being disposed rearwardly of said forward beam;

(d) a top member including a third pivotal connection to said forward beam and a fourth pivotal connection to said rearward beam; the distance between the first and third pivotal connections of said forward beam being substantially equal to the distance between the second and fourth pivotal connections of said rearward beam, and the distance between the third and fourth pivotal connections of said top member being substantially equal to the distance between the first and second pivotal connections of said base member, said forward and rearward beams projecting substantially above said base member and said top member being disposed above said base member; and (e) lock means for releasably locking said forward beam and said rearward beam in upright positions above said base member.

2. The support rack of claim 1, further comprising rearwardly extending support arms coupled to said top member.

3. The support rack of claim 2, wherein said support arms are slidably coupled to said top member for removable engagement therewith.

4. The support rack of claim 1, wherein said forward beam is parallel to said rearward beam, said beams extending generally vertically when locked in upright positions.

5. The support rack of claim 1, wherein said base member is generally horizontal and the first and second pivotal connections of said forward and rearward beams both lie substantially within a horizontal plane.

6. The support rack of claim 1, wherein said lock means comprise a first lock arm pivotally attached to said rearward beam, said first lock arm having a forward end releasably secured to said forward beam when said beams are in upright positions.

7. The support rack of claim 6, wherein said first lock arm is angled relative to said beams, said first lock arm further comprising a rearwardly extending end that projects behind said rearward beam such that said first lock arm can be pivotally moved by applying a downward force to said rearwardly extending end.

8. The support rack of claim 7, wherein said lock means further comprises a second lock arm pivotally attached to said rearward beam, said second lock arm having a forward end releasably secured to said forward beam when said beams are in upright positions, said second lock arm having the same angle relative to said beams as said first lock arm, said second lock arm further comprising a rearwardly extending end that projects behind said rearward beam such that said second lock arm can be pivotally moved by applying a downward force to said rearwardly extending end, the release of both of said lock arms allowing said beams to pivot relative to said base member; said lock means further including biasing means for biasing the forward ends of said lock arms in a downward direction.

9. The support rack of claim 7, further comprising at least one support arm coupled to said top member and extending rearwardly therefrom.

10. The support rack of claim 7, wherein said lock means further comprise a lock fastener secured to said forward beam and wherein said first lock arm is L shaped and includes a notch at its forward end for releasable attachment to said lock fastener.

11. The support rack of claim 1, further comprising a ski rack attachment coupled to said top member.

12. The support rack of claim 11, wherein said ski rack attachment includes a main frame and mounting arms attached to said main frame, said mounting arms being removably coupled to said top member.

13. The support rack of claim 12, wherein said ski rack attachment further includes a hinge assembly attached between said mounting arms and said main frame, said hinge assembly allowing said main frame to be pivoted relative to said top member.

14. The support rack of claim 13, wherein said hinge assembly includes a detent pin and an aperture plate affixed to said main frame, said aperture plate having pin apertures to receive said detent pin, each pin aperture corresponding to a discrete pivot position of said main frame.

15. The support rack of claim 1, further comprising a crank clamp attachment coupled to the top of said top member, said crank clamp attachment comprising:

a support member coupled to said top member; and a first crank clamp arranged and configured to secure a crank arm of a bicycle, said crank clamp being affixed to said support member.

16. The support rack of claim 15, wherein said crank clamp attachment further comprises a first wheel rail for securing a wheel of the bicycle held by said crank clamp, said wheel rail being affixed to said support member.

17. The support rack of claim 16, wherein said first crank clamp includes an upwardly projecting C-shaped housing to receive the crank arm and a screw engaged within the back of the housing to clamp the end of the crank arm against the housing.

18. The support rack of claim 16, wherein said crank clamp attachment further comprises a second crank clamp arranged and configured to secure a crank arm of a bicycle, said second crank clamp being affixed to said support member and spaced from said first crank clamp; said crank clamp attachment further comprising a second wheel rail for securing a wheel of the bicycle held by said second crank clamp, said second wheel rail being affixed to said support member and spaced from said first wheel rail.

19. The support rack of claim 18, wherein said crank clamp attachment further comprises a third crank clamp arranged and configured to secure a crank arm of a bicycle, said third crank clamp being affixed to said support member and spaced from said first and said second crank clamps; said crank clamp attachment further comprising a third wheel rail for securing a wheel of the bicycle held by said third crank clamp, said third wheel rail being affixed to said support member and spaced from said first and second wheel rails.

20. The support rack of claim 18, wherein said support member comprises a plate secured to said top member, said plate having forward, rearward, left, and fight edges, the intersections of said edges forming corners, said wheel rails being attached at opposite corners of said plate.

21. The support rack of claim 16, further comprising rearwardly extending support arms coupled to said top member.

22. A support rack for carrying articles behind a vehicle having a forward end and a rearward end, the rack comprising:

(a) a base securable to the rearward end of the vehicle to project rearwardly therefrom and be removably fixed with respect to the vehicle;

(b) a top member disposed above said base, said top member including at least one support arm extending rearwardly;

(c) a forward beam extending upwardly from said base and including a pivotal connection to said base and a pivotal connection to said top member; and (d) a rearward beam extending upwardly from said base and including a pivotal connection to said base and a pivotal connection to said top member, said rearward beam being disposed rearwardly of said forward beam, wherein the distance between the pivotal connections of said forward beam to said base and said top member is substantially the same as the distance between the pivotal connections of said rearward beam to said base and said top member, and wherein the distance between the pivotal connections of the beams to the top member is substantially the same as the distance between the pivotal connections of the beams to the bottom member.

23. The support rack of claim 22, further comprising a lock member securable to at least one of said beams for releasably locking said forward and rearward beams in upright positions extending upwardly from said base.

24. The support rack of claim 22, wherein said lock member is securable between said forward beam and said rearward beam.

25. A support rack for carrying articles behind a vehicle having a forward end and a rear end, the rack comprising:
   (a) a base member securable to the rear end of the vehicle to project rearwardly from the vehicle;
   (b) a forward beam pivotally connected to said base member and projecting upwardly therefrom;
   (c) a rearward beam pivotally connected to said base member and projecting upwardly therefrom, said rearward beam being disposed rearwardly of said forward beam;
   (d) a top member pivotally connected to said forward beam and pivotally connected to said rearward beam; the distance between the pivotal connections of said forward beam to said base member and said top member being substantially equal to the distance between the pivotal connections of said rearward beam to said base member and said top member, and the distance between the pivotal connections of said top member to said forward and rearward beams being substantially equal to the distance between the pivotal connections of said base member to said forward and rearward beams, said top member including at least one rearwardly extending arm; and
   (e) lock means for releasably locking said forward beam and said rearward beam in upright positions above said base member.

* * * * *